(12) United States Patent
Hasegawa et al.

(10) Patent No.: US 6,264,761 B1
(45) Date of Patent: Jul. 24, 2001

(54) ALLOY FOIL FOR LIQUID-PHASE DIFFUSION BONDING BONDABLE IN OXIDIZING ATMOSPHERE

(76) Inventors: Yasushi Hasegawa; Eiji Tsuru; Yuichi Sato; Shigekatsu Ozaki, all of c/o Nippon Steel Corporation Technical Development Bureau, 20-1, Shintomi, Futtsu City, Chiba (JP)

(*) Notice: Subject to any disclaimer, the term of this patent is extended or adjusted under 35 U.S.C. 154(b) by 0 days.

(21) Appl. No.: 09/214,635

(22) PCT Filed: Jul. 11, 1997

(86) PCT No.: PCT/JP97/02422

§ 371 Date: Jan. 6, 1999

§ 102(e) Date: Jan. 6, 1999

(87) PCT Pub. No.: WO98/02271

PCT Pub. Date: Jan. 22, 1998

(30) Foreign Application Priority Data

Jul. 12, 1996 (JP) .................................................... 8-183603

(51) Int. Cl.[7] .................................................... C22C 19/03
(52) U.S. Cl. ........................ 148/403; 148/304; 148/426; 428/606
(58) Field of Search ........................ 428/606; 148/304, 148/312, 403, 426; 420/441

(56) References Cited

U.S. PATENT DOCUMENTS

| | | | |
|---|---|---|---|
| 4,250,229 | * | 2/1981 | Kear et al. ............................ 428/606 |
| 4,302,515 | * | 11/1981 | DeCristofaro et al. ............... 148/403 |
| 4,745,037 | * | 5/1988 | DeCristofaro et al. ............... 148/403 |
| 4,871,622 | * | 10/1989 | Rabinkin ................................ 428/607 |
| 5,683,822 | * | 11/1997 | Hasegawa et al. .................... 428/606 |
| 5,759,300 | * | 6/1998 | Hasegawa et al. .................... 428/606 |

FOREIGN PATENT DOCUMENTS

| | | |
|---|---|---|
| 56-116803 | 9/1981 | (JP) . |
| 63-49381 | 3/1988 | (JP) . |
| 1-258865 | 10/1989 | (JP) . |
| 2-151377 | 6/1990 | (JP) . |
| 2-151378 | 6/1990 | (JP) . |
| 2-185940 | 7/1990 | (JP) . |
| 5-115984 | 5/1993 | (JP) . |
| 5-138370 | 6/1993 | (JP) . |
| 7-268521 | 10/1995 | (JP) . |
| 7-276066 | 10/1995 | (JP) . |

* cited by examiner

Primary Examiner—George Wyszomierski
(74) Attorney, Agent, or Firm—Kenyon & Kenyon

(57) ABSTRACT

The present invention provides liquid phase diffusion bonding alloy foils capable of bonding in an oxidizing atmosphere, which can ensure joints with a homogeneous structure and adequate tensile strength in air in a short period of time using various alloys or Fe-based materials as materials to be bonded; specifically, they are Ni-based liquid phase diffusion bonding alloy foils with compositions comprising as essential components in terms of atomic percent, the diffusion elements B or P at 1.0–20.0% or B and P each at 1.0–20.0%, and Si at 0.5 to $\leq 15\%$ or 0.5 to <10% and V at 0.1–20.0%, with the remainder substantially Ni and unavoidable impurities, and having a thickness of 3–100 $\mu$m. If necessary, one or more types of Cr, Mn or Mo, Co, and/or one or more types of W, Nb and Ti may be selectively included as appropriate. Compositions with a substantially amorphous crystal structure are most effective.

24 Claims, 13 Drawing Sheets

B concentration in insert metal (atomic %)

Tensile strength of liquid phase diffusion joint (MPa)

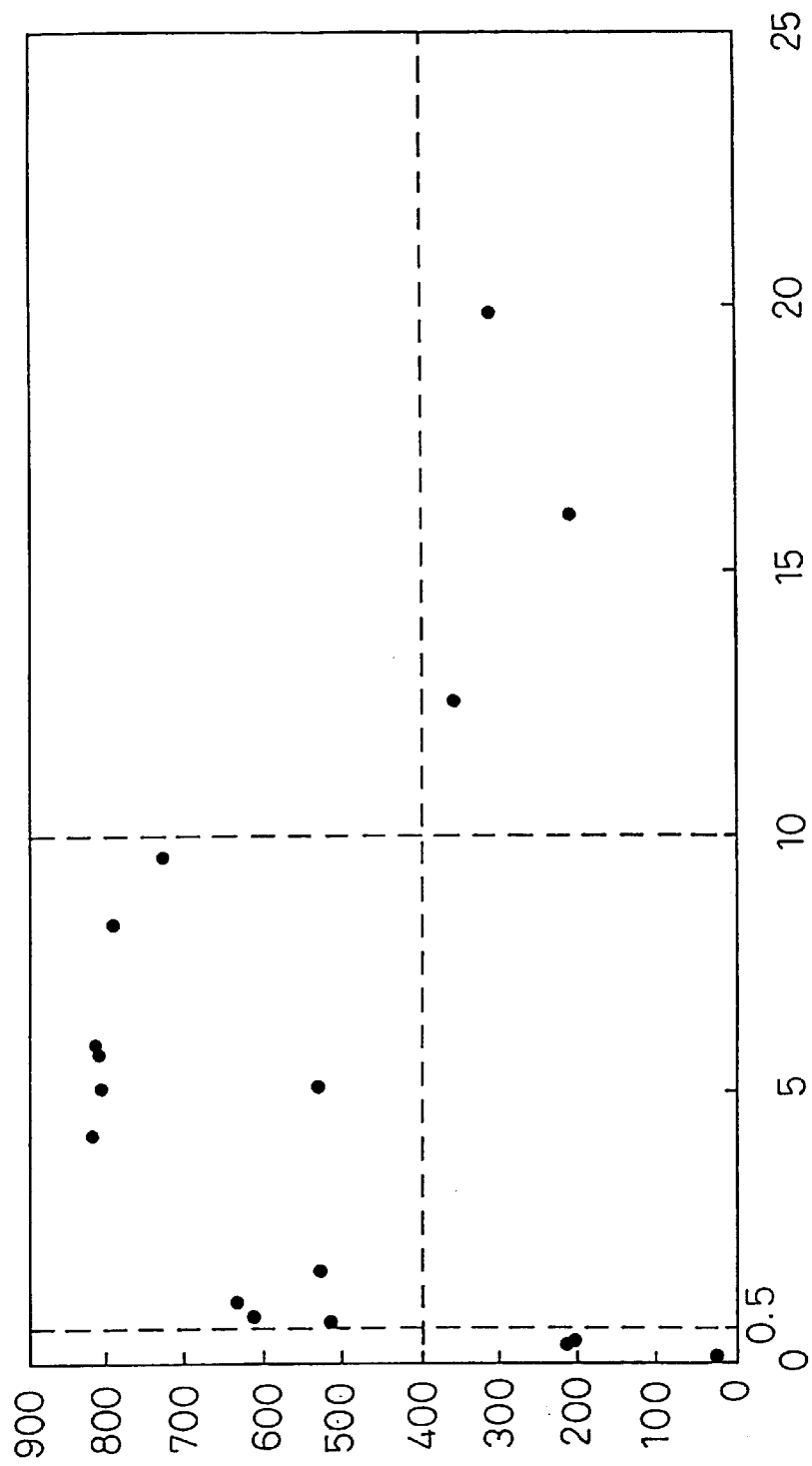

ALLOY FOIL FOR LIQUID-PHASE DIFFUSION BONDING BONDABLE IN OXIDIZING ATMOSPHERE

TECHNICAL FIELD

The present invention relates to a Ni-based liquid phase diffusion bonding alloy foil for bonding Fe-based materials such as steel plates, steel pipes and bar steel (including steel wires and reinforcing steel), which allows liquid phase diffusion bonding in an oxidizing atmosphere and can give bonds with excellent bonding strength in a short time.

BACKGROUND ART

Liquid phase diffusion bonding is a bonding method whereby an alloy in the form of a foil, powder plating and having a eutectic composition with a lower melting point than the materials to be bonded is situated and compressed between the materials to be bonded, and the joint is heated to a temperature just above the liquidus of the insert alloy (hereunder referred to as "insert metal") for melting followed by isothermal solidification, and it is considered to be one type of the solid phase bonding methods. Because liquid phase diffusion bonding allows bonding to be accomplished with relatively low pressure application, it has been conventionally used for bonding which requires absolutely minimal residual stress and deformation by bonding and has mainly been applied for high-alloy steel and heat-resistant steel for which simultaneous welding is difficult, and for bonding between these and carbon steel.

Liquid phase diffusion bonding is most commonly employed for bonding of materials containing at least 0.50% Cr as the alloy composition. Cr-containing materials are characterized by forming dense Cr oxide (usually $Cr_2O_3$) films on their surfaces, and thus exhibiting excellent oxidation resistance and corrosion resistance. Consequently, the bonding heat also naturally causes formation of oxide films on the bonding surface, and this inhibits wetting of the molten insert metal and considerably interferes with diffusion of atoms which is essential for bonding, so that it has been difficult to obtain satisfactory joints.

For this reasons all such conventional attempts, such as seen in Japanese Unexamined Patent Publications No. 53-81458, No. 62-34685 and No. 62-227595, have tended to entail notable increases in bonding costs, since the vacuum, inertness and reducing property of the bonding atmosphere must be maintained for the liquid phase diffusion bonding.

The present inventors have conducted much research aimed at providing liquid phase diffusion bonding to be employed as a means of bonding stainless steel, high nickel-based alloys, heat resistant alloy steels and other related alloy steels, whereby the liquid phase diffusion bonding can be achieved even when an oxide film is produced on the bonded material surface in air, to give a satisfactory joint in a short time and at a reduced bonding cost, and as a result we have found that such liquid phase diffusion bonding is possible even in an oxidizing atmosphere such as air by using an insert metal containing P or B, or P and B, as the diffusing elements, containing V at 0.1–20.0 atomic percent and having an increased amount of Si.

In other words, it had already been found that while V is the element which increases the melting point of the insert metal, an insert metal with very excellent bonding properties can be obtained by appropriately adjusting the other elements (entirely Si according to the invention), and this is employed for liquid diffusion bonding of primarily stainless steel, high nickel-based alloys, heat resistant alloy steels and these alloy steels with carbon steel, such as already disclosed in Japanese Unexamined Patent Publications No. 2-151377, No. 2-151378, No. 2-185940, No. 7-268521, No. 7-276066, etc. Liquid phase diffusion bonding alloy foil has been proposed which allows bonding of a Ni base containing P or B, or P and B, as the diffusing elements and containing V and Si, in an oxidizing atmosphere.

However, although the aforementioned inventions are all foils with high bonding properties containing large amounts of Si for the purpose of lowering the melting point of the insert metal, they are often unsuitable as bonding alloy foils in cases which demand casting properties for the foils and relatively high toughness for the bonded materials.

Specifically, it often occurs that the elasticity of the foil is reduced rendering it very brittle, or that the Si diffuses into the matrix after liquid phase diffusion bonding, resulting in an unwanted hardness increase and a considerably lower toughness in the so-called weld heat-affected zone.

DISCLOSURE OF THE INVENTION

The present invention provides a Ni-based liquid phase diffusion bonding alloy foil for bonding even Fe-based materials represented by steel materials such as steel plates, steel pipes and bar steel (including steel wires and reinforcing steel) comprising various alloys and carbon steel, which allows bonding in an oxidizing atmosphere and can ensure junctions of homogeneous composition with sufficient applied stress in short periods of time in an oxidizing atmosphere.

The present invention relates to a Ni-based liquid phase diffusion bonding alloy foil which contains Ni as the base and B, Si and V or P, Si and V or P, B, Si and V as essential components, and which can be bonded in an oxidizing atmosphere.

The first invention is a liquid phase diffusion bonding alloy foil capable of bonding in an oxidizing atmosphere, characterized by having a composition containing B: 1.0–20.0%,
Si: 0.5–<15.0%,
V: 0.1–20.0% in terms of atomic percent and the remainder substantially Ni and unavoidable impurities, and by having a thickness of 3–100 µm.

The second invention is a liquid phase diffusion bonding alloy foil capable of bonding in an oxidizing atmosphere, characterized by having a composition containing B: 1.0–20.0%,
Si: 0.5–<15.0%,
V: 0.1–20.0%, and one or more types of Cr: 0.1–20.0%,
Mn: 0.1–10.0%,
Co: 0.1–15.0% in terms of atomic percent and the remainder substantially Ni and unavoidable impurities, and by having a thickness of 3–100 µm.

The third invention is a liquid phase diffusion bonding alloy foil capable of bonding in an oxidizing atmosphere, characterized by having a composition containing B: 1.0–20.0%,
Si: 0.5–<15.0%,
V: 0.1–20.0%, and one or more types of

W: 0.1–10.0%,

Nb: 0.1–10.0%,
Ti: 0.1–10.0%
in terms of atomic percent and the remainder substantially Ni and unavoidable impurities, and by having a thickness of 3–100 μm.

The fourth invention is a liquid phase diffusion bonding alloy foil capable of bonding in an oxidizing atmosphere, characterized by having a composition containing
B: 1.0–20.0%,
Si: 0.5–<15.0%,
V: 0.1–20.0%,
and one or more types of
Cr: 0.1–20.0%,
Mn: 0.1–10.0%,
Co: 0.1–15.0%,
and additionally one or more types of
W: 0.1–10.0%,
Nb: 0.1–10.0%,
Ti: 0.1–10.0%
in terms of atomic percent and the remainder substantially Ni and unavoidable impurities, and by having a thickness of 3–100 μm.

The fifth invention is a liquid phase diffusion bonding alloy foil capable of bonding in an oxidizing atmosphere, characterized by having a composition containing
P: 1.0–20.0%,
Si: 0.5–<15.0%,
V: 0.1–20.0%
in terms of atomic percent and the remainder substantially Ni and unavoidable impurities, and by having a thickness of 3–100 μm.

The sixth invention is a liquid phase diffusion bonding alloy foil capable of bonding in an oxidizing atmosphere, characterized by having a composition containing
P: 1.0–20.0%,
Si: 0.5–<15.0%,
V: 0.1–20.0%,
and one or more types of
Cr: 0.1–20.0%,
Mo: 0.1–15.0%,
Co: 0.1–15.0%
in terms of atomic percent and the remainder substantially Ni and unavoidable impurities, and by having a thickness of 3–100 μm.

The seventh invention is a liquid phase diffusion bonding alloy foil capable of bonding in an oxidizing atmosphere, characterized by having a composition containing
P: 1.0–20.0%,
Si: 0.5–<15.0%,
V: 0.1–20.0%,
and one or more types of
W: 0.1–10.0%,
Nb: 0.1–10.0%,
Ti: 0.1–10.0%
in terms of atomic percent and the remainder substantially Ni and unavoidable impurities, and by having a thickness of 3–100 μm.

The eighth invention is a liquid phase diffusion bonding alloy foil capable of bonding in an oxidizing atmosphere, characterized by having a composition containing
P: 1.0–20.0%,
Si: 0.5–<15.0%,
V: 0.1–20.0%,
and one or more types of
Cr: 0.1–20.0%,
Mo: 0.1–15.0%,
Co: 0.1–15.0%,
and additionally one or more types of
W: 0.1–10.0%,
Nb: 0.1–10.0%,
Ti: 0.1–10.0%
in terms of atomic percent and the remainder substantially Ni and unavoidable impurities, and by having a thickness of 3–100 μm.

The ninth invention is a liquid phase diffusion bonding alloy foil capable of bonding in an oxidizing atmosphere, characterized by having a composition containing
P: 1.0–20.0%,
B: 1.0–20.0%,
Si: 0.5–<10.0%,
V: 0.1–20.0%
in terms of atomic percent and the remainder substantially Ni and unavoidable impurities, and by having a thickness of 3–100 μm.

The tenth invention is a liquid phase diffusion bonding alloy foil capable of bonding in an oxidizing atmosphere, characterized by having a composition containing
P: 1.0–20.0%,
B: 1.0–20.0%,
Si: 0.5–<10.0%,
V: 0.1–20.0%,
and one or more types of
Cr: 0.1–20.0%,
Mn: 0.1–10.0%,
Co: 0.1–15.0%
in terms of atomic percent and the remainder substantially Ni and unavoidable impurities, and by having a thickness of 3–100 μm.

The eleventh invention is a liquid phase diffusion bonding alloy foil capable of bonding in an oxidizing atmosphere, characterized by having a composition containing
P: 1.0–20.0%,
B: 1.0–20.0%
Si: 0.5–<10.0%,
V: 0.1–20.0%,
and one or more types of
W: 0.1–10.0%,
Nb: 0.1–10.0%,
Ti: 0.1–10.0%
in terms of atomic percent and the remainder substantially Ni and unavoidable impurities, and by having a thickness of 3–100 μm.

The twelfth invention is a liquid phase diffusion bonding alloy foil capable of bonding in an oxidizing atmosphere, characterized by having a composition containing
P: 1.0–20.0%,
B: 1.0–20.0%,
Si: 0.5–<10.0%,
V: 0.1–20.0%,
and one or more types of
Cr: 0.1–20.0%,
Mn: 0.1–10.0%,
Co: 0.1–15.0%, and additionally one or more types of
W: 0.1–10.0%,
Nb: 0.1–10.0%,
Ti: 0.1–10.0%
in terms of atomic percent and the remainder substantially Ni and unavoidable impurities, and by having a thickness of 3–100 μm.

The thirteenth invention is a liquid phase diffusion bonding alloy foil capable of bonding in an oxidizing atmosphere, according to any of the first to twelfth inventions, characterized in that the crystal structure of the composition is substantially amorphous.

For the purpose of the invention,
"Fe-based material" means a steel material composed of any type of carbon steel containing at least 50% Fe in terms of atomic percent.

"Substantially amorphous" means that at least 50% of the crystal structure of the composition is amorphous. "Liquid phase diffusion bonding" includes diffusion brazing, and is any bonding method whereby an alloy in the form of a foil, powder or plating and having a eutectic composition with a lower melting point than the materials to be bonded is situated and compressed between the materials to be bonded, and the joint is heated to a temperature just above the liquidus of the insert alloy (hereunder referred to as "insert metal") for melting followed by isothermal solidification; here, melting includes not only a total molten state but also a 50% or greater molten state.

"Oxidizing atmosphere" means an atmosphere which contains at least 0.1% oxygen gas in terms of volume percent of the bonding atmosphere, and has an oxygen partial pressure of at least $10^{-3}$ atm, i.e. oxidizing power of at least 0.1% in terms of oxygen concentration even when containing a reducing gas such as $H_2$, $H_2S$, water vapor or the like.

Unless otherwise specified, "melting point" means the solidus on the phase diagram in the case of alloys which are divalent or of greater valency.

BRIEF DESCRIPTION OF THE DRAWINGS

FIG. 14 is a graph showing the relationship between the joint tensile strength and the Si content of a Ni-based insert metal containing B and P for liquid phase diffusion bonding using an Fe-based material as the bonded material.

BEST MODE FOR CARRYING OUT THE INVENTION

Figure 1:
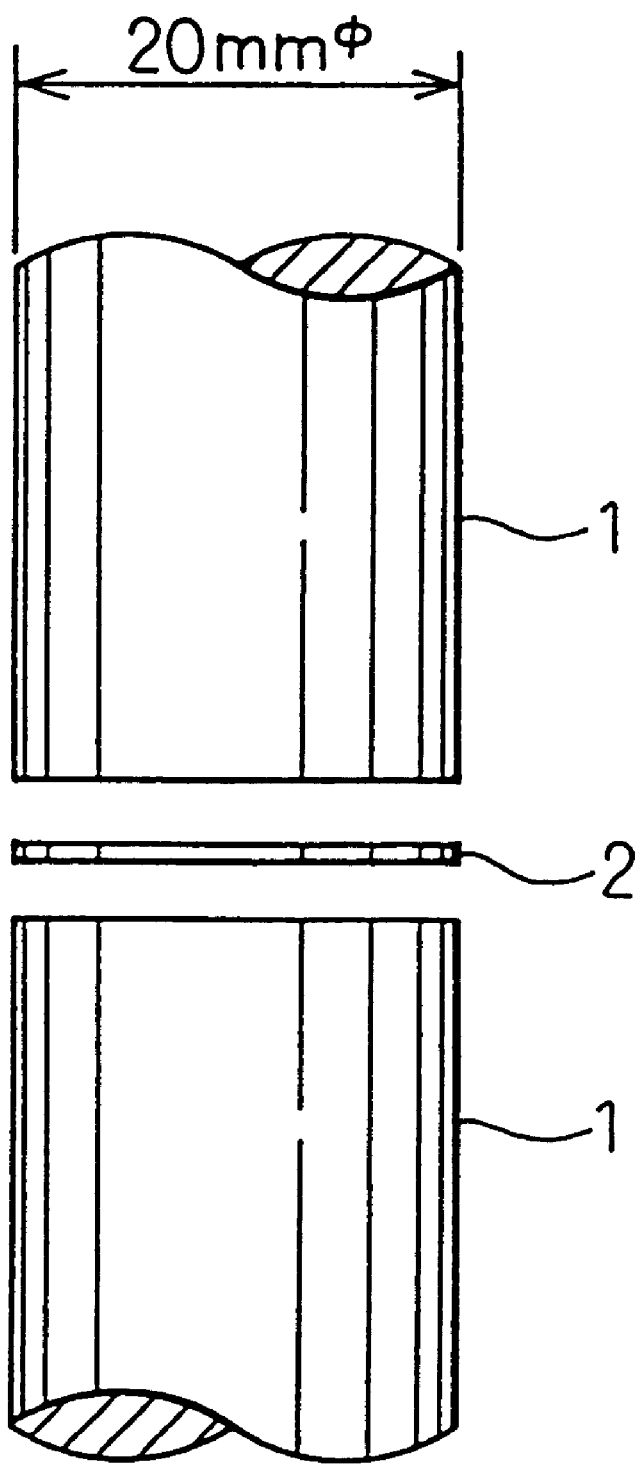
FIG. 1 is a plan view showing an example of liquid phase diffusion bonding with a liquid phase diffusion bonding alloy foil (insert metal), where the materials to be bonded are round steel bonding specimens.

The present inventors have noted the effect obtained with Ni-based liquid phase diffusion bonding alloy foils containing P, Si and V or B, Si and V or P, B, Si and V, such as already disclosed in Japanese Unexamined Patent Publication No. 2-151377, No. 2-151378, No. 2-185940, No. 7-268521, No. 7-276066, etc., and have carried out much research on liquid phase diffusion bonding alloy foils which are not burdened with problems of non-uniform composition, etc. even when bonding Fe-based materials; the inventors have eventually obtained a tough foil wherein the Si concentration is limited to less than 15% or less than 10% as the necessary amount and the other components, particularly P and B, are appropriately limited, and have thus arrived at the present invention as a novel alloy foil composition which has no effect on the matrix material.

This alloy foil is Ni-based, but since the Si concentration is low it can be applied for bonding of iron-based materials, and can give joints with superior properties in the weld heat-affected zone, even when bonding heterogeneous materials such as ferrite-austenite.

(1) According to the first to fourth inventions and the thirteenth invention of the present invention, the Ni-based liquid phase diffusion bonding alloy foil capable of bonding in an oxidizing atmosphere contains as essential components B as the diffusion element which contributes to a lower melting point, Si which contributes to a lower melting point and V which alleviates the effect of the oxide film; with these components there are included one or more selected from among Cr, Mn and Co which primarily increase the corrosion resistance of the joint or one or more selected from among W, Nb and Ti which primarily increase the joint strength, or there are simultaneously included one or more selected from among Cr, Mn and Co which primarily increase the corrosion resistance of the joint and one or more selected from among W, Nb and Ti which primarily increase the joint strength.

The aforementioned diffusion elements and selected components are combined and added appropriately depending on the component composition for bonding and the intended characteristics of the joint.

B and P are known as diffusion elements, but here B was chosen as a diffusion element which has a larger diffusion coefficient and drastically shortens the bonding time and increases the bonding strength in comparison to P, despite its high bonding temperature of 1050–1300° C.

Thus, the liquid phase diffusion bonding alloy foil of the invention is used mainly for bonding of materials wherein the toughness of the heat-affected zone does not decrease in this temperature range.

(2) According to the fifth to eighth inventions and the thirteenth invention, the Ni-based liquid phase diffusion bonding alloy foil capable of bonding in an oxidizing atmosphere contains as essential Components P as the diffusion element which contributes to a lower melting point, Si which contributes to a lower melting point and V which alleviates the effect of the oxide film; with these components there are included one or more selected from among Cr, Mo and Co which primarily increase the corrosion resistance of the joint or one or more selected from among W, Nb and Ti which primarily increase the joint tensile strength, or there are simultaneously included one or more selected from among Cr, Mn and Co which primarily increase the corrosion resistance of the joint and one or more selected from among W, Nb and Ti which primarily increase the joint tensile strength.

The aforementioned diffusion elements and selected components are combined and added appropriately depending on the component composition for bonding and the intended characteristics of the joint.

B and P are known as diffusion atoms, but here P was chosen as a diffusion element which has a smaller diffusion coefficient than B and therefore a longer bonding time, but also has a low bonding temperature of 950–1050° C., allowing the heat source unit to be reduced.

Thus, the liquid phase diffusion bonding alloy foil of the invention is used mainly for bonding, for example, Fe-based materials containing Mo which may tend to produce coarse crystal grains and thus exhibit lower toughness at the heat-affected zone when bonded in a high temperature range of 1050° C. and above.

(3) According to the ninth to twelfth inventions and the thirteenth invention, the Ni-based liquid phase diffusion bonding alloy foil capable of bonding in an oxidizing atmosphere contains, as essential components, B and P as the diffusion elements which contribute to a lower melting point, Si which contributes to a lower melting point and V which alleviates the effect of the oxide film; with these components there are included one or more selected from among Cr, Mn and Co which primarily increase the corrosion resistance of the joint or one or more selected from among W, Nb and Ti which primarily increase the joint tensile strength, or there are simultaneously included one or more selected from among Cr, Mn and Co which primarily increase the corrosion resistance of the joint and one or more selected from among W, Nb and Ti which primarily increase the joint tensile strength.

The aforementioned diffusion elements and selected components are combined and added appropriately depending on the component composition for bonding and the intended characteristics of the joint.

B and P are known as diffusion elements, and here B is used in combination with P so that the complementary action of P will avoid problems such as coarse crystal grains and lower toughness at the heat-affected zone when bonding in a high temperature range of 1050° C. and above, even when the material to be bonded is an Fe-based material containing Mo, for example, and so that the bonding time can be shorter than with P alone.

Thus, the liquid phase diffusion bonding alloy foil of the invention may be applied to a wider range of objects for bonding.

The components included according to the invention will now be explained in connection with the purpose and amounts of their inclusion.

(1) Ni base (Ni included at 50% or greater in terms of atomic percent).

Ni is resistant to oxidation and has a relatively low melting point, so that it is suitable as a bonding material.

(2) B at 1.0–20.0%

B is an element used as a diffusion element to achieve isothermal solidification necessary for the liquid phase diffusion bonding, and also to give a lower melting point than the material being bonded; for these purposes it must be present at a content of 1.0% or greater, but detailed research by the present inventors has shown that if the content exceeds 20.0% coarse Mo- and Cr-containing borides are produced near the joint in cases where the material to be bonded contains Mo and Cr, thus resulting in a lower joint tensile strength, and therefore the range is determined to be 1.0–20.0%.

(3) P at 1.0–20.0%

P is an element used as a diffusion element to achieve the isothermal solidification necessary for the liquid phase diffusion bonding, and also to give a lower melting point than the material being bonded; for these purposes it must be present at a content of 1.0% or greater, but detailed research by the present inventors has shown that if the content exceeds 20.0% coarse metal compounds of 5 $\mu$m and greater are produced among the crystal grains on the bonded material side, thus resulting in a lower joint tensile strength, and therefore the range is determined to be 1.0–20.0%.

(4) Si at 0.5–<15.0%

Si is an element effective for lowering the melting point, and it prevents relatively higher melting points and longer bonding times which result from large addition of V. At less than 0.5% the effect is more moderate. At 15.0% and greater coarse Si-containing oxides are produced in the insert metal during liquid phase diffusion bonding in an oxidizing atmosphere, thus impairing the tensile strength and toughness.

However, when B and P are added in combination in the range defined above, the upper limit is preferably less than 10%. When the Si content is 10% or greater accelerated vitrification results in poorer founding properties, a non-uniform thickness and lower tensile strength of the joint.

(5) V at 0.1–20.0%

V is an element which converts the oxide film on the surface of the material being bonded, for example $Fe_2O_3$ in the case of bonding an Fe-based material, into the low melting point compound oxide $V_2O_5$—$Fe_2O_3$ (melting point approximately 800° C.).

Thus, by melting at the bonding temperature (900–1200° C.) and because of spheroidization due to the difference in surface tension in the liquid phase, better wetting of the material being bonded and the insert metal is achieved.

The diffusion elements B and P are very important elements which, being virtually unaffected by the surface oxide film, freely diffuse between the spheroidized oxides to accomplish liquid phase diffusion bonding in an oxidizing atmosphere.

At less than 0.1% the melting of the oxide film is insufficient and fails to give an effect, while at greater than 20.0% the melting point of the insert metal is over 1300° C. making it substantially impossible to achieve liquid phase diffusion bonding.

(6) Cr at 0.1–20.0%

Cr serves primarily to increase the corrosion resistance and oxidation resistance. At less than 0.1% the effect is insufficient, and at greater than 20.0% the melting point of the alloy foil increases dramatically, resulting in poorer productivity and an increase to very high temperatures (1300° C. or higher) which are substantially outside of the range for the liquid phase diffusion bonding temperature.

(7) Mn at 0.1–10.0%

Mn has the effect of increasing the strength by solid dissolution of Ni. At less than 0.1% the effect is insufficient, and at greater than 10.0% it can become a cause of lower joint tensile strength due to poor toughness. The Mn is effective primarily in cases where B is used as the diffusion element.

(8) Mo at 0.1–15.0%

Mo is indispensable for improving the corrosion resistance as is Cr, and especially has an effect of improving the stress corrosion cracking resistance and improving the creep strength at the joint through solid solution reinforcement at high temperatures. At less than 0.1% the effect is insufficient, and at greater than 15.0% coarse metal compounds are produced which cause poor toughness and lower joint tensile strength.

When B is used as the diffusion element, Mo causes deposition of high-melting-point borides at the grain boundaries which impair the toughness and lower the joint tensile strength, and so it is preferably not used when the diffusion element is B.

(9) Co at 0.1–15.0%

Co is added primarily to increase the corrosion and oxidation resistance, and to confer additional strength. At less than 0.1% the effect is insufficient, and at greater than 15.0% coarse intermetallic compounds are produced in the insert metal thus inhibiting toughness of the joint.

(10) W, Nb and Ti at 0.1–10.0% each

W serves to increase the tensile strength of the joint. At less than 0.10% there is no effect, and at greater than 10.0% the high temperature strength is instead lowered due to coarse Laves phase deposition caused by dendritic crystal segregation.

Nb has the effect of enhancing the toughness when diffused in the base material as carbides, nitrides or carbonitrides. At less than 0.1% the effect is insufficient, and at greater than 10.0% coarse intermetallic compounds are often produced which notably impair the toughness of the joint.

Ti serves to increase the tensile strength of the joint, and it also increases the toughness when uniformly dispersed as carbides and nitrides. At less than 0.1% the effect is insufficient, and at greater than 10.0% coarse intermetallic compounds are produced which notably impair the toughness of the joint.

The liquid phase diffusion bonding alloy foil of the invention which has the component composition described above requires uniform melting during the liquid phase diffusion bonding in order to give a satisfactory joint.

With a non-uniform composition, segregation of the alloy components will create a situation in which the melting point of the insert metal will differ depending on the location of the joint, so that the bonding interface will not be homogeneous and a satisfactory joint cannot be obtained.

In fact, in order to avoid a non-uniform composition and segregation of the alloy components, the crystal structure is preferred to be amorphous.

In cases where a uniform composition can be obtained even with a crystalline structure, it is not essential for the crystal structure to be amorphous.

The liquid phase diffusion bonding alloy foil of the invention can be provided as insert metals in various forms.

Alloys with any of the components according to the first to twelfth inventions can be easily produced as amorphous alloy foils by, for example, liquid quenching.

The basic production process employed in this case is a liquid quenching process whereby the molten alloy is blown out through a nozzle onto a cooled substrate and cooled to hardness by thermal contact, and particularly a simple single-roll quenching process may be applied whereby a single cold roll is used as the cooled substrate.

Alternative processes include centrifugal quenching processes using the inner walls of drums and processes using endless-type belts, as well as improvements on these processes involving supplementary rolls or roll surface temperature control devices, and casting under reduced pressure and in a vacuum or inert gas atmosphere is also included. Twin-roll processes whereby the melt is poured between a pair of rolls for quenching solidification may also be applied.

In addition, the alloy may be vacuum melted and cast, and the resulting cast strip is rolled and annealed by a common process to provide the alloy foil.

The alloy foil obtained in this manner will be more advantageous for liquid phase diffusion bonding if it has a smaller thickness since that will result in less variation in mechanical properties near the joint and less time required for bonding, but if the thickness is less than 3 $\mu$m the absolute V content in the alloy foil will be insufficient to counter the oxide film on the surface of the material being bonded, while if it is over 100 $\mu$m the time required to complete the liquid phase diffusion bonding will increase to 10 hours or more, which is impractical; therefore, the alloy foil is preferred to have a thickness of 3–100 $\mu$m.

Although the present invention relates to alloy foils for liquid phase diffusion bonding, the bonding can also be accomplished in air, and thus it can be usefully applied to diffusion brazing bonding methods as well.

EXAMPLES

Liquid phase diffusion bonding of Fe-based materials (carbon steel) as bonded materials was carried out using liquid phase diffusion bonding alloys according to the invention. The conditions employed and the results obtained will now be described along with comparative examples, with reference to the tables and drawings.

Approximately 100 g each of different alloys with component compositions (in atomic percent) according to one of the first to fourth inventions of the present invention were quenched by the single-roll quenching process (cooling roll: Cu alloy, 300 mm diameter), to form alloy foils of substantially amorphous crystal structure, to sheet widths of 2–215 mm and sheet thicknesses of 3–100 $\mu$m.

The circumferential speed of the cooling roll at this time was kept between 5.0–15.0 m/s.

The component compositions (atomic percent) of the alloy foils of the invention for these examples, all of which are Ni-based, were as shown in Table 1, where the differences between the totals of the compositions in Table 1 and 100% indicate the total concentrations of Ni and unavoidable impurities.

The component compositions (atomic percent) of the alloy foils for comparison with the alloy foils of the invention are shown in Table 2. As with the alloy foils of the invention, all are Ni-based and the differences between the totals of the compositions in Table 2 and 100% indicate the total concentrations of Ni and unavoidable impurities. The comparison alloy foils in Table 2 were prepared in exactly the same manner as the alloy foils of the invention in Table 1.

Liquid phase diffusion bonding was carried out using the alloy foils listed in Tables 1, 5 and 7 which conform with the first to twelfth inventions and the thirteenth invention of the present invention (hereunder referred to as "insert metals of the invention") and the comparison alloy foils listed in Tables 2, 6 and 8 (including conventional-type insert metals, hereunder referred to as "comparison insert metals").

For these examples, the insert metals of the invention were formed into disks of 3–100 μm thickness and 20 mm diameter, and the comparison insert metals into disks of 7.67–234.10 μm thickness and 20 mm diameter, and were sandwiched between round steel (20 mm diameter) and round steel (20 mm diameter) made of an Fe-based material (SKT400) as the material to be bonded, as shown in FIG. 1.

In FIG. 1, 1 is the material to be bonded (round steel) and 2 is the liquid phase diffusion bonding alloy (insert metal).

The liquid phase diffusion bonding atmosphere was air, the bonding temperature was in the range from just above the melting point of each alloy foil to 50° C. above the melting point, and a large-sized heating furnace was used for liquid phase diffusion bonding with the target temperature set to substantially 950–1300° C.

The material to be bonded 2 and the insert metal 3 were both compressed at a pressure force of 2 megapascals (MPa) to improve the adhesion between them.

The bonding time was 10 minutes for all the foils, and, in order to ensure tensile strength, corrosion resistance and toughness of the bonded materials, the bonding was followed by thermal treatment which comprised annealing, quenching+annealing, annealing+tempering or quenching+annealing+tempering, as appropriate either alone or in different combinations.

Mutual diffusion of the elements in the bonded materials occurred during the thermal treatment, promoting homogenization of the joints, and virtually no production, increase or growth of deposits was cast in the insert metals of the invention.

The soundness of the joints was examined with a #JISA2 subsize round steel tensile testing apparatus, and the non-bonded area ratio was 0% in all of the test pieces with insert metals of the invention.

Figure 2:
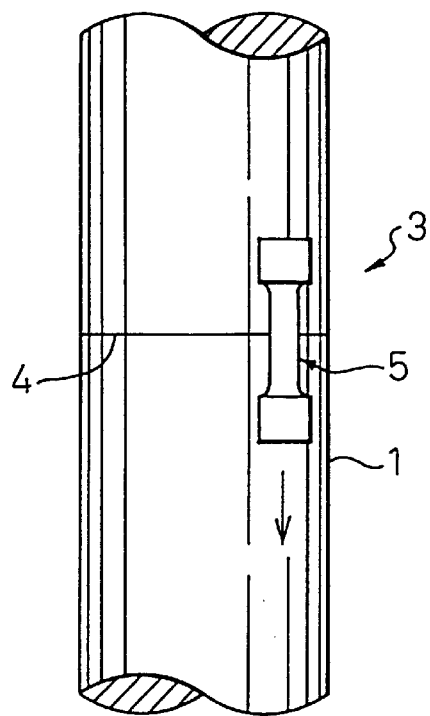
FIG. 2 is a plan view showing an example of a round steel specimen obtained by liquid phase diffusion bonding, where a tensile test piece is also being sampled.
Figure 3:
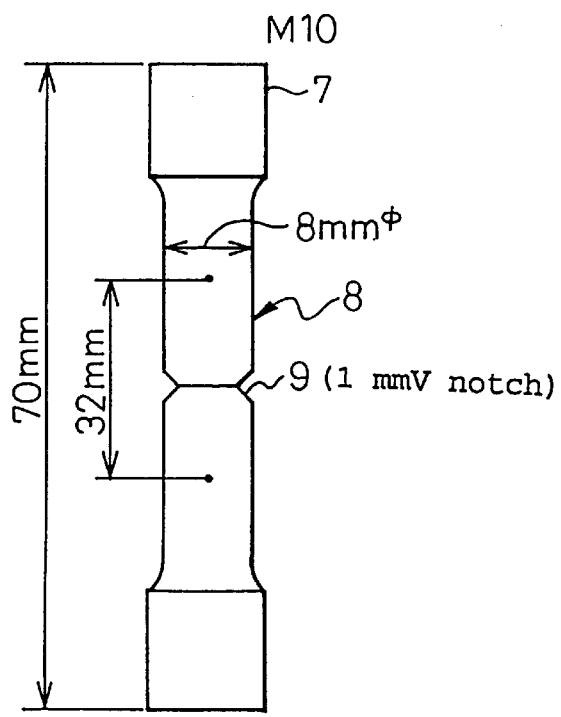
FIG. 3 is a plan view showing an example of a tensile test piece sampled by a tensile test piece sampling apparatus.

In addition, a #JISA2 tensile test piece such as shown in FIG. 3 was cut out in the axial direction of the round steel from the region shown in FIG. 2, and a tensile tester was used to examine the relative tensile strength of the joint at normal temperature.

The tensile strength for joints is determined by the quality of the materials bonded, the plate thickness and the conditions of the use environment, and for these examples 400 MPa was provisionally set as the minimum required strength based on practical restrictions, and bonds were judged as adequate if a tensile strength at or above this level was obtained. The results of the experiment are shown in Tables 1 to 8 and FIGS. 4 to 13.

Example 1

Embodiments of diffusion bonding alloy foils according to the first to fourth inventions and the thirteenth invention, in which B was included as the diffusion element and Si and V as essential components, will now be explained based on Tables 1, 2, 3 and 4 and FIGS. 4 to 9.

TABLE 1-1

| No. | Chemical components in alloy foil (atomic %) | | | | | | | | | Alloy foil thickness (μm) | Bonding atmosphere | Tensile strength (MPa) |
| --- | --- | --- | --- | --- | --- | --- | --- | --- | --- | --- | --- | --- |
| | B | Si | V | Cr | Mn | Co | W | Nb | Ti | | | |
| 1 | 5.75 | 13.40 | 18.76 | | | | | | | 98 | air | 543.79 |
| 2 | 2.21 | 10.91 | 14.44 | | | | | | | 17 | air | 522.19 |
| 3 | 14.36 | 8.66 | 10.98 | | | | | | | 58 | air | 504.88 |
| 4 | 7.04 | 12.94 | 2.63 | | | | | | | 19 | air | 463.14 |
| 5 | 8.45 | 8.61 | 1.22 | | | | | | | 52 | air | 456.08 |
| 6 | 6.58 | 14.20 | 7.26 | | | | | | | 4 | air | 486.29 |
| 7 | 16.83 | 8.21 | 6.57 | | | | | | | 37 | air | 482.85 |
| 8 | 9.10 | 14.97 | 3.98 | | | | | | | 62 | air | 469.91 |
| 9 | 7.85 | 5.07 | 10.94 | | | | | | | 74 | air | 504.72 |
| 10 | 7.55 | 13.88 | 16.57 | | | | | | | 100 | air | 532.83 |
| 11 | 18.55 | 9.10 | 17.24 | 1.72 | | | | | | 97 | air | 536.22 |
| 12 | 19.91 | 5.28 | 13.46 | 11.05 | | | | | | 78 | air | 517.32 |
| 13 | 5.28 | 2.41 | 6.41 | 10.63 | | | | | | 90 | air | 482.07 |
| 14 | 12.63 | 2.99 | 2.87 | | 1.56 | | | | | 19 | air | 464.33 |
| 15 | 11.79 | 7.78 | 12.59 | | 5.63 | | | | | 54 | air | 512.97 |
| 16 | 9.65 | 3.74 | 7.29 | | 3.09 | | | | | 64 | air | 486.43 |
| 17 | 13.74 | 6.44 | 2.57 | | | 6.08 | | | | 29 | air | 462.85 |
| 18 | 8.82 | 3.49 | 14.39 | | | 5.78 | | | | 86 | air | 521.95 |
| 19 | 17.05 | 14.34 | 10.67 | | | 3.43 | | | | 70 | air | 503.33 |
| 20 | 7.50 | 1.22 | 16.52 | 16.10 | 4.53 | | | | | 54 | air | 532.61 |
| 21 | 16.52 | 5.51 | 6.63 | 14.91 | 5.92 | | | | | 77 | air | 483.14 |
| 22 | 12.43 | 4.66 | 7.99 | 0.98 | 4.01 | | | | | 48 | air | 489.97 |

TABLE 1-1-continued

| | Chemical components in alloy foil (atomic %) | | | | | | | | | Alloy foil thickness | Bonding | Tensile strength |
|---|---|---|---|---|---|---|---|---|---|---|---|---|
| No. | B | Si | V | Cr | Mn | Co | W | Nb | Ti | (μm) | atmosphere | (MPa) |
| 23 | 2.78 | 13.43 | 2.52 | | 9.46 | 14.75 | | | | 39 | air | 462.61 |
| 24 | 13.52 | 13.54 | 14.56 | | 6.24 | 1.54 | | | | 79 | air | 522.81 |
| 25 | 1.48 | 5.32 | 16.64 | | 5.00 | 2.58 | | | | 15 | air | 533.19 |

TABLE 1-2

| | Chemical components in alloy foil (atomic %) | | | | | | | | | Alloy foil thickness | Bonding | Tensile strength |
|---|---|---|---|---|---|---|---|---|---|---|---|---|
| No. | B | Si | V | Cr | Mn | Co | W | Nb | Ti | (μm) | atmosphere | (MPa) |
| 26 | 9.04 | 6.87 | 10.17 | 5.29 | | 5.31 | | | | 16 | air | 500.87 |
| 27 | 13.12 | 9.17 | 15.85 | 0.20 | | 10.03 | | | | 57 | air | 529.27 |
| 28 | 8.86 | 1.64 | 1.30 | 6.35 | | 13.56 | | | | 88 | air | 456.48 |
| 29 | 5.04 | 9.77 | 18.89 | 17.09 | 4.50 | 2.61 | | | | 34 | air | 544.44 |
| 30 | 10.50 | 4.60 | 7.12 | 3.02 | 3.12 | 4.79 | | | | 65 | air | 485.62 |
| 31 | 10.20 | 2.68 | 8.61 | 5.77 | 7.60 | 12.63 | | | | 79 | air | 493.04 |
| 32 | 2.03 | 14.80 | 6.84 | | | | 5.24 | | | 21 | air | 536.59 |
| 33 | 1.92 | 6.23 | 15.91 | | | | 4.22 | | | 69 | air | 571.79 |
| 34 | 3.50 | 7.54 | 3.65 | | | | 8.30 | | | 26 | air | 551.24 |
| 35 | 5.28 | 2.72 | 12.71 | | | | | 6.53 | | 52 | air | 559.29 |
| 36 | 7.56 | 7.51 | 15.86 | | | | | 8.60 | | 77 | air | 589.53 |
| 37 | 6.86 | 3.99 | 13.49 | | | | | 0.35 | | 6 | air | 519.92 |
| 38 | 10.28 | 4.07 | 14.67 | | | | | | 6.98 | 49 | air | 579.18 |
| 39 | 16.84 | 2.50 | 19.70 | | | | | | 9.85 | 68 | air | 627.29 |
| 40 | 14.58 | 13.09 | 10.97 | | | | | | 1.04 | 96 | air | 513.13 |
| 41 | 1.31 | 5.88 | 11.35 | | | | 8.27 | 8.07 | | 55 | air | 645.87 |
| 42 | 11.47 | 2.66 | 12.91 | | | | 0.91 | 1.10 | | 100 | air | 531.32 |
| 43 | 19.90 | 9.28 | 7.65 | | | | 5.50 | 7.23 | | 52 | air | 593.86 |
| 44 | 15.20 | 14.92 | 15.18 | | | | 2.71 | | 4.22 | 4 | air | 578.62 |
| 45 | 3.64 | 7.66 | 1.91 | | | | 6.48 | | 0.41 | 89 | air | 508.24 |
| 46 | 1.28 | 3.40 | 17.12 | | | | | 7.86 | 6.54 | 8 | air | 642.91 |
| 47 | 12.28 | 9.17 | 16.97 | | | | 0.26 | | 5.79 | 84 | air | 583.76 |
| 48 | 9.40 | 8.20 | 17.78 | | | | 7.01 | | 4.85 | 72 | air | 647.81 |
| 49 | 9.06 | 10.65 | 0.24 | | | | 8.87 | | 8.47 | 18 | air | 607.62 |
| 50 | 8.52 | 11.01 | 10.85 | | | | 2.96 | 4.87 | 1.35 | 87 | air | 578.79 |

TABLE 1-3

| | Chemical components in alloy foil (atomic %) | | | | | | | | | Alloy foil thickness | Bonding | Tensile strength |
|---|---|---|---|---|---|---|---|---|---|---|---|---|
| No. | B | Si | V | Cr | Mn | Co | W | Nb | Ti | (μm) | atmosphere | (MPa) |
| 51 | 19.35 | 1.78 | 3.51 | | | | 2.99 | 4.14 | 5.16 | 98 | air | 567.68 |
| 52 | 7.89 | 11.59 | 4.16 | | | | 8.30 | 9.12 | 3.27 | 47 | air | 643.82 |
| 53 | 3.20 | 5.44 | 11.82 | 1.97 | | | 4.67 | | | 100 | air | 555.78 |
| 54 | 5.98 | 6.09 | 14.61 | 19.62 | | | 4.80 | | | 88 | air | 571.07 |
| 55 | 19.73 | 1.65 | 16.04 | 6.85 | | | 2.93 | | | 39 | air | 559.51 |
| 56 | 13.45 | 7.26 | 3.77 | 8.92 | | | | 1.60 | | 6 | air | 480.03 |
| 57 | 5.29 | 13.74 | 6.90 | 3.27 | | | | 6.48 | | 72 | air | 529.84 |
| 58 | 18.48 | 5.34 | 16.97 | 18.56 | | | | 5.06 | | 11 | air | 570.26 |
| 59 | 8.24 | 3.33 | 14.44 | 13.27 | | | | | 7.45 | 50 | air | 581.78 |
| 60 | 3.23 | 3.80 | 19.13 | 16.97 | | | | | 1.79 | 46 | air | 559.98 |
| 61 | 11.52 | 8.27 | 10.82 | 0.28 | | | | | 4.56 | 69 | air | 540.54 |
| 62 | 8.01 | 12.91 | 16.88 | 12.18 | | | 5.08 | 2.87 | | 48 | air | 605.26 |
| 63 | 2.31 | 7.31 | 17.72 | 6.46 | | | 8.25 | 6.59 | | 18 | air | 667.29 |
| 64 | 6.95 | 10.81 | 10.92 | 19.49 | | | 3.69 | 2.96 | | 78 | air | 562.23 |
| 65 | 13.57 | 10.54 | 6.70 | 1.73 | | | | 9.90 | 3.15 | 25 | air | 577.99 |

TABLE 1-3-continued

| | Chemical components in alloy foil (atomic %) | | | | | | | | | Alloy foil thickness (μm) | Bonding atmosphere | Tensile strength (MPa) |
|---|---|---|---|---|---|---|---|---|---|---|---|---|
| No. | B | Si | V | Cr | Mn | Co | W | Nb | Ti | | | |
| 66 | 3.83 | 0.74 | 19.45 | 13.99 | | | | 6.92 | 1.89 | 22 | air | 610.79 |
| 67 | 10.49 | 4.79 | 11.97 | 16.98 | | | | 5.56 | 4.92 | 13 | air | 588.18 |
| 68 | 16.93 | 8.02 | 11.85 | 13.13 | | | 6.12 | | 1.15 | 48 | air | 579.65 |
| 69 | 19.03 | 10.30 | 4.35 | 18.47 | | | 0.69 | | 2.97 | 88 | air | 502.40 |
| 70 | 17.90 | 9.27 | 9.38 | 19.50 | | | 2.50 | | 1.33 | 11 | air | 532.55 |
| 71 | 14.05 | 10.16 | 18.09 | 15.28 | | | 8.16 | 1.26 | 9.99 | 60 | air | 710.75 |
| 72 | 13.37 | 1.69 | 11.30 | 2.05 | | | 9.50 | 5.90 | 2.52 | 35 | air | 662.93 |
| 73 | 1.16 | 4.86 | 2.19 | 7.79 | | | 1.40 | 6.22 | 5.88 | 7 | air | 565.52 |
| 74 | 18.79 | 1.17 | 11.26 | | 6.44 | | 7.16 | | | 30 | air | 577.92 |
| 75 | 2.57 | 5.52 | 7.38 | | 5.79 | | 0.71 | | | 56 | air | 494.03 |

TABLE 1-4

| | Chemical components in alloy foil (atomic %) | | | | | | | | | Alloy foil thickness (μm) | Bonding atmosphere | Tensile strength (MPa) |
|---|---|---|---|---|---|---|---|---|---|---|---|---|
| No. | B | Si | V | Cr | Mn | Co | W | Nb | Ti | | | |
| 76 | 3.00 | 0.57 | 12.55 | | 1.38 | | 9.06 | | | 25 | air | 603.39 |
| 77 | 3.25 | 14.34 | 0.12 | | 3.47 | | | 1.66 | | 95 | air | 462.22 |
| 78 | 16.73 | 4.28 | 5.52 | | 1.36 | | 5.00 | | | 56 | air | 512.57 |
| 79 | 13.46 | 14.52 | 9.46 | | 9.33 | | | 5.47 | | 80 | air | 535.56 |
| 80 | 17.45 | 11.89 | 6.07 | | 0.56 | | | | 2.29 | 52 | air | 498.63 |
| 81 | 5.36 | 8.64 | 7.41 | | 2.01 | | | | 8.58 | 72 | air | 555.74 |
| 82 | 11.37 | 5.43 | 16.36 | | 1.86 | | | | 6.06 | 14 | air | 580.32 |
| 83 | 19.94 | 9.42 | 19.54 | | 3.98 | | 6.37 | 6.73 | | 52 | air | 658.47 |
| 84 | 18.80 | 6.55 | 8.51 | | 3.67 | | 1.95 | 6.47 | | 77 | air | 557.26 |
| 85 | 10.14 | 7.87 | 9.88 | | 2.28 | | 3.76 | 2.77 | | 99 | air | 556.36 |
| 86 | 6.31 | 12.93 | 15.50 | | 3.26 | | 4.62 | | 6.02 | 47 | air | 608.02 |
| 87 | 8.62 | 14.42 | 10.12 | | 4.79 | | | 1.24 | 2.31 | 15 | air | 527.79 |
| 88 | 9.76 | 6.77 | 12.39 | | 8.00 | | | 4.87 | 4.60 | 43 | air | 582.84 |
| 89 | 18.92 | 2.30 | 9.17 | | 3.31 | | 6.54 | | 3.41 | 54 | air | 608.50 |
| 90 | 17.14 | 13.22 | 7.58 | | 0.34 | | 9.12 | | 5.20 | 12 | air | 620.75 |
| 91 | 12.35 | 1.78 | 19.88 | | 6.88 | | 8.44 | | 8.04 | 78 | air | 698.08 |
| 92 | 2.01 | 5.56 | 5.38 | | 0.53 | | 8.03 | 3.44 | 0.79 | 40 | air | 587.61 |
| 93 | 8.94 | 1.37 | 14.46 | | 0.65 | | 2.70 | 7.06 | 5.89 | 26 | air | 645.90 |
| 94 | 2.24 | 14.65 | 15.20 | | 8.95 | | 5.11 | 5.32 | 8.74 | 62 | air | 684.26 |
| 95 | 5.24 | 4.56 | 8.26 | | | 14.66 | 2.15 | | | 38 | air | 512.81 |
| 96 | 5.24 | 12.68 | 9.77 | | | 10.71 | 9.81 | | | 68 | air | 596.96 |
| 97 | 2.56 | 3.85 | 12.03 | | | 10.03 | 6.40 | | | 37 | air | 574.13 |
| 98 | 7.28 | 8.93 | 16.32 | | | 13.93 | | 0.49 | | 58 | air | 535.04 |
| 99 | 8.59 | 5.03 | 2.29 | | | 2.12 | | 8.08 | | 80 | air | 518.03 |
| 100 | 5.28 | 1.94 | 19.66 | | | 11.08 | | 7.53 | | 51 | air | 601.04 |

TABLE 1-5

| | Chemical components in alloy foil (atomic %) | | | | | | | | | Alloy foil thickness (μm) | Bonding atmosphere | Tensile strength (MPa) |
|---|---|---|---|---|---|---|---|---|---|---|---|---|
| No. | B | Si | V | Cr | Mn | Co | W | Nb | Ti | | | |
| 101 | 5.73 | 8.12 | 4.63 | | | 14.29 | | | 4.49 | 32 | air | 509.11 |
| 102 | 13.56 | 8.51 | 11.30 | | | 4.38 | | | 2.27 | 94 | air | 524.63 |
| 103 | 9.09 | 14.39 | 19.92 | | | 3.96 | | | 6.99 | 35 | air | 605.50 |
| 104 | 12.61 | 12.39 | 0.97 | | | 7.98 | 9.43 | 7.39 | | 31 | air | 600.86 |
| 105 | 13.68 | 14.57 | 9.89 | | | 6.08 | 4.37 | 0.17 | | 68 | air | 544.30 |
| 106 | 15.04 | 6.24 | 18.97 | | | 5.04 | 6.71 | 0.63 | | 89 | air | 616.33 |
| 107 | 10.38 | 7.72 | 4.44 | | | 6.29 | | 7.94 | 5.01 | 41 | air | 567.87 |
| 108 | 3.90 | 3.65 | 11.78 | | | 1.62 | | 4.59 | 5.73 | 81 | air | 586.88 |

TABLE 1-5-continued

| No. | B | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|
| 109 | 1.87 | 9.03 | 6.16 | | | 1.33 | | 6.39 | 9.62 | 10 | air | 602.46 |
| 110 | 18.61 | 13.71 | 14.65 | | | 4.29 | 6.96 | | 3.76 | 62 | air | 622.93 |
| 111 | 15.03 | 13.44 | 17.65 | | | 7.13 | 2.18 | | 2.67 | 57 | air | 581.38 |
| 112 | 16.13 | 6.10 | 9.94 | | | 7.13 | 3.66 | | 3.60 | 9 | air | 565.12 |
| 113 | 8.73 | 14.99 | 16.12 | | | 10.68 | 2.62 | 2.47 | 4.80 | 12 | air | 612.51 |
| 114 | 16.22 | 9.71 | 11.56 | | | 11.10 | 7.75 | 3.93 | 2.39 | 54 | air | 632.00 |
| 115 | 9.41 | 6.86 | 8.67 | | | 8.48 | 1.42 | 1.63 | 9.49 | 77 | air | 594.87 |
| 116 | 15.43 | 8.32 | 18.91 | 12.58 | 2.43 | | 1.97 | | | 54 | air | 564.28 |
| 117 | 1.84 | 9.33 | 18.26 | 10.46 | 3.12 | | 1.46 | | | 9 | air | 555.91 |
| 118 | 3.45 | 12.73 | 2.92 | 8.02 | 0.24 | | 1.92 | | | 28 | air | 483.79 |
| 119 | 19.85 | 10.66 | 14.55 | 8.92 | 1.32 | | | 4.38 | | 41 | air | 553.37 |
| 120 | 8.73 | 1.68 | 19.62 | 18.59 | 9.64 | | | 6.62 | | 29 | air | 594.40 |
| 121 | 6.60 | 4.54 | 16.00 | 19.71 | 6.70 | | | 6.98 | | 47 | air | 578.82 |
| 122 | 14.02 | 10.00 | 10.87 | 5.98 | 5.24 | | | | 7.34 | 39 | air | 563.12 |
| 123 | 6.89 | 3.11 | 15.50 | 1.53 | 5.23 | | | | 4.70 | 14 | air | 565.09 |
| 124 | 18.23 | 4.44 | 3.37 | 15.58 | 1.76 | | | | 9.26 | 83 | air | 540.98 |
| 125 | 19.59 | 3.51 | 9.24 | 16.97 | 6.92 | | 9.10 | 3.71 | | 77 | air | 613.17 |

TABLE 1-6

| No. | B | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|
| 126 | 14.68 | 11.52 | 17.72 | 7.50 | 1.08 | | 9.78 | 0.74 | | 68 | air | 641.53 |
| 127 | 3.33 | 0.55 | 18.05 | 13.48 | 8.07 | | 5.96 | 1.80 | | 4 | air | 612.46 |
| 128 | 12.43 | 9.37 | 5.95 | 2.80 | 3.37 | | | 4.79 | 1.06 | 13 | air | 521.72 |
| 129 | 9.43 | 13.00 | 18.95 | 11.57 | 2.23 | | | 3.24 | 9.99 | 86 | air | 647.42 |
| 130 | 18.63 | 12.32 | 14.87 | 16.57 | 0.96 | | | 1.46 | 1.66 | 51 | air | 547.84 |
| 131 | 4.05 | 14.46 | 19.85 | 8.98 | 8.58 | | 9.88 | | 8.32 | 63 | air | 714.63 |
| 132 | 2.76 | 13.99 | 18.02 | 2.08 | 8.72 | | 1.70 | | 5.61 | 50 | air | 601.98 |
| 133 | 8.76 | 9.47 | 16.01 | 10.84 | 8.78 | | 3.96 | | 6.71 | 36 | air | 623.38 |
| 134 | 10.54 | 0.51 | 8.91 | 6.58 | 8.31 | | 7.92 | 8.51 | 6.28 | 51 | air | 683.54 |
| 135 | 10.11 | 4.63 | 5.47 | 4.12 | 0.38 | | 3.05 | 5.18 | 0.75 | 99 | air | 550.07 |
| 136 | 9.33 | 11.69 | 19.08 | 1.22 | 2.16 | | 3.34 | 6.82 | 6.25 | 65 | air | 676.50 |
| 137 | 10.55 | 9.83 | 17.65 | | 1.15 | 0.66 | 9.47 | | | 34 | air | 632.97 |
| 138 | 17.29 | 12.46 | 12.09 | | 7.93 | 14.21 | 1.22 | | | 7 | air | 522.64 |
| 139 | 8.41 | 8.03 | 13.83 | | 9.13 | 12.29 | 8.35 | | | 11 | air | 602.65 |
| 140 | 19.93 | 13.42 | 5.28 | | 2.40 | 1.22 | | 2.74 | | 91 | air | 495.59 |
| 141 | 19.08 | 10.75 | 8.33 | | 1.64 | 3.49 | | 1.58 | | 61 | air | 502.73 |
| 142 | 8.96 | 6.26 | 8.55 | | 2.08 | 13.29 | | 7.37 | | 30 | air | 544.36 |
| 143 | 19.70 | 8.49 | 3.78 | | 9.92 | 11.54 | | | 4.82 | 72 | air | 507.46 |
| 144 | 19.82 | 10.00 | 2.63 | | 2.70 | 11.54 | | | 6.36 | 66 | air | 514.04 |
| 145 | 8.65 | 3.98 | 17.37 | | 3.50 | 6.39 | | | 6.33 | 38 | air | 587.53 |
| 146 | 18.60 | 11.86 | 17.30 | | 8.61 | 13.10 | 9.39 | 7.32 | | 53 | air | 681.59 |
| 147 | 3.47 | 6.18 | 7.80 | | 4.83 | 3.45 | 8.93 | 8.06 | | 22 | air | 634.78 |
| 148 | 4.33 | 5.61 | 9.58 | | 9.09 | 14.30 | 6.56 | 6.70 | | 10 | air | 610.39 |
| 149 | 5.80 | 1.39 | 11.48 | | 9.22 | 14.81 | | 9.85 | 3.09 | 74 | air | 601.03 |
| 150 | 1.77 | 0.78 | 13.65 | | 5.35 | 2.30 | | 4.70 | 9.95 | 95 | air | 630.69 |

TABLE 1-7

| No. | B | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|
| 151 | 17.51 | 3.71 | 11.88 | | 9.82 | 2.79 | | 1.19 | 5.36 | 54 | air | 560.55 |

TABLE 1-7-continued

| | Chemical components in alloy foil (atomic %) | | | | | | | | Alloy foil thickness | Bonding | Tensile strength |
|---|---|---|---|---|---|---|---|---|---|---|---|
| No. | B | Si | V | Cr | Mn | Co | W | Nb | Ti | ($\mu$m) | atmosphere | (MPa) |
| 152 | 12.41 | 8.65 | 15.14 | | 1.12 | 10.50 | 2.55 | | 0.79 | 27 | air | 557.53 |
| 153 | 9.27 | 6.25 | 16.86 | | 6.31 | 7.01 | 9.60 | | 2.94 | 82 | air | 653.83 |
| 154 | 4.75 | 8.60 | 11.68 | 4.66 | | 2.87 | 8.47 | | 6.41 | 14 | air | 644.39 |
| 155 | 9.07 | 11.92 | 14.51 | | 1.13 | 12.13 | 1.97 | 5.00 | 7.34 | 94 | air | 636.00 |
| 156 | 3.27 | 8.36 | 7.63 | | 1.26 | 5.60 | 6.66 | 5.07 | 2.04 | 61 | air | 606.61 |
| 157 | 9.39 | 9.71 | 14.12 | | 6.95 | 9.22 | 6.09 | 7.71 | 5.98 | 73 | air | 683.33 |
| 158 | 9.39 | 14.16 | 13.37 | 12.77 | | 13.49 | 1.43 | | | 79 | air | 531.13 |
| 159 | 4.44 | 4.98 | 17.05 | 13.41 | | 9.19 | 8.81 | | | 78 | air | 623.32 |
| 160 | 7.10 | 10.08 | 0.16 | 9.81 | | 7.26 | 8.69 | | | 32 | air | 537.64 |
| 161 | 10.57 | 11.31 | 5.36 | 14.15 | | 5.49 | | 3.05 | | 58 | air | 498.15 |
| 162 | 17.55 | 13.04 | 8.64 | 7.46 | | 13.56 | | 6.05 | | 80 | air | 535.56 |
| 163 | 3.21 | 4.06 | 8.46 | 9.78 | | 12.66 | | 1.69 | | 87 | air | 504.14 |
| 164 | 10.41 | 5.17 | 15.18 | 0.72 | | 3.89 | | | 8.00 | 75 | air | 589.86 |
| 165 | 17.30 | 1.54 | 1.19 | 12.62 | | 9.46 | | | 3.46 | 84 | air | 483.59 |
| 166 | 2.41 | 12.31 | 16.30 | 17.67 | | 11.17 | | | 9.43 | 19 | air | 606.95 |
| 167 | 13.38 | 13.77 | 7.62 | 16.93 | | 14.76 | 6.53 | 9.45 | | 86 | air | 619.60 |
| 168 | 3.31 | 11.90 | 6.59 | 2.13 | | 7.51 | 9.71 | 6.88 | | 56 | air | 628.23 |
| 169 | 14.64 | 10.48 | 15.01 | 3.53 | | 4.57 | 9.60 | 1.75 | | 85 | air | 633.33 |
| 170 | 13.97 | 14.46 | 3.43 | 0.96 | | 7.40 | | 7.40 | 2.71 | 94 | air | 540.65 |
| 171 | 9.96 | 10.51 | 6.06 | 9.66 | | 3.88 | | 8.33 | 3.34 | 21 | air | 565.31 |
| 172 | 1.86 | 4.54 | 16.63 | 8.01 | | 6.12 | | 9.40 | 6.91 | 75 | air | 654.25 |
| 173 | 3.75 | 14.62 | 12.14 | 13.68 | | 1.99 | 9.21 | | 1.73 | 27 | air | 616.63 |
| 174 | 12.97 | 7.16 | 15.68 | 1.47 | | 7.32 | 2.80 | | 1.68 | 54 | air | 569.88 |
| 175 | 6.83 | 9.30 | 15.61 | 0.76 | | 9.40 | 4.10 | | 5.05 | 55 | air | 609.48 |

TABLE 1-8

| | Chemical components in alloy foil (atomic %) | | | | | | | | Alloy foil thickness | Bonding | Tensile strength |
|---|---|---|---|---|---|---|---|---|---|---|---|
| No. | B | Si | V | Cr | Mn | Co | W | Nb | Ti | ($\mu$m) | atmosphere | (MPa) |
| 176 | 7.53 | 2.03 | 15.40 | 1.73 | | 12.96 | 9.01 | 9.14 | 6.98 | 43 | air | 736.89 |
| 177 | 6.72 | 8.44 | 0.14 | 5.07 | | 0.59 | 1.57 | 9.83 | 5.34 | 49 | air | 577.90 |
| 178 | 18.29 | 1.26 | 5.32 | 4.80 | | 0.61 | 8.38 | 4.97 | 7.07 | 16 | air | 651.74 |
| 179 | 4.16 | 5.23 | 9.53 | 17.76 | 1.43 | 12.13 | 1.38 | | | 98 | air | 511.44 |
| 180 | 6.64 | 9.05 | 10.98 | 1.77 | 3.96 | 10.50 | 5.36 | | | 53 | air | 558.51 |
| 181 | 17.37 | 10.70 | 10.04 | 4.43 | 3.75 | 8.88 | 8.87 | | | 33 | air | 588.89 |
| 182 | 1.19 | 13.62 | 8.33 | 12.09 | 0.95 | 7.12 | | 7.85 | | 53 | air | 546.60 |
| 183 | 19.49 | 10.71 | 4.59 | 1.52 | 9.12 | 9.10 | | 2.08 | | 22 | air | 487.53 |
| 184 | 16.82 | 9.44 | 15.55 | 0.80 | 3.97 | 9.33 | | 7.93 | | 59 | air | 583.29 |
| 185 | 15.06 | 1.05 | 16.12 | 17.74 | 6.70 | 14.45 | | | 3.23 | 78 | air | 556.42 |
| 186 | 16.48 | 6.90 | 14.71 | 1.67 | 5.63 | 5.03 | | | 5.41 | 54 | air | 566.85 |
| 187 | 14.73 | 11.50 | 18.89 | 13.96 | 2.16 | 8.28 | | | 4.31 | 34 | air | 578.97 |
| 188 | 1.24 | 2.39 | 11.33 | 8.19 | 6.57 | 10.21 | 5.49 | 6.11 | | 11 | air | 604.38 |
| 189 | 13.51 | 4.80 | 15.08 | 6.80 | 8.94 | 0.98 | 9.89 | 8.86 | | 43 | air | 686.32 |
| 190 | 18.95 | 13.87 | 19.88 | 1.89 | 4.41 | 4.05 | 4.55 | 7.21 | | 82 | air | 645.30 |
| 191 | 15.08 | 6.37 | 11.30 | 0.51 | 8.74 | 6.82 | | 9.40 | 3.43 | 36 | air | 599.74 |
| 192 | 9.10 | 12.72 | 6.01 | 5.49 | 9.34 | 3.89 | | 3.30 | 5.76 | 65 | air | 549.19 |
| 193 | 13.27 | 11.23 | 10.00 | 7.44 | 4.97 | 9.10 | | 2.34 | 5.94 | 26 | air | 563.86 |
| 194 | 7.39 | 2.37 | 3.71 | 18.54 | 7.69 | 11.72 | 0.46 | | 3.94 | 89 | air | 504.67 |
| 195 | 16.52 | 14.85 | 7.92 | 19.51 | 3.55 | 3.38 | 3.54 | | 4.25 | 42 | air | 559.01 |
| 196 | 8.17 | 9.03 | 16.15 | 5.10 | 0.48 | 2.14 | 6.63 | | 7.36 | 42 | air | 656.01 |
| 197 | 8.10 | 12.58 | 1.30 | 15.62 | 2.65 | 7.62 | 4.97 | 9.62 | 2.67 | 5 | air | 594.83 |
| 198 | 12.18 | 14.97 | 10.38 | 3.83 | 4.34 | 3.89 | 7.19 | 1.19 | 3.85 | 37 | air | 612.98 |
| 199 | 7.62 | 12.14 | 18.66 | 4.93 | 9.42 | 12.48 | 4.88 | 2.47 | 4.76 | 54 | air | 647.50 |

TABLE 2

| No. | B | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|
| 200 | 0.25 | 10.87 | 15.60 | | | | | | | 47.41 | air | 0.12 |
| 201 | 25.41 | 10.90 | 0.15 | | | | | | | 30.27 | air | 253.16 |
| 202 | 15.62 | 0.06 | 11.11 | | | | | | | 64.69 | air | 0.22 |
| 203 | 12.16 | 20.11 | 10.15 | | | | | | | 72.30 | air | 328.13 |
| 204 | 3.20 | 4.04 | 0.02 | | | | | | | 52.33 | air | 0.01 |
| 205 | 11.25 | 12.59 | 31.44 | | | | | | | 59.03 | air | 323.50 |
| 206 | 5.85 | 6.05 | 12.51 | 25.38 | | | | | | 59.38 | air | 176.66 |
| 207 | 4.54 | 13.83 | 17.09 | | 18.16 | | | | | 48.16 | air | 289.02 |
| 208 | 12.07 | 14.75 | 10.27 | | | 19.95 | | | | 7.73 | air | 302.85 |
| 209 | 17.62 | 12.50 | 9.13 | 13.15 | | | 11.48 | | | 93.12 | air | 132.07 |
| 210 | 18.83 | 7.37 | 6.83 | | | | | 12.66 | | 63.58 | air | 145.51 |
| 211 | 6.57 | 1.04 | 8.63 | | | 3.14 | | | 14.37 | 83.45 | air | 132.82 |
| 212 | 16.79 | 2.38 | 2.78 | | 4.45 | | | | | 150.32 | air | 198.86 |

TABLE 3

| | B | P | Si | V | Ni |
|---|---|---|---|---|---|
| B-based insert metal | 8.0 | | 5.0 | 8.0 | Base |
| P-based insert metal | | 8.0 | 5.0 | 8.0 | Base |

TABLE 4

| | Temperature (° C.) | Stress (MPa) |
|---|---|---|
| B-based insert metal | 1150 | 2.0 |
| P-based insert metal | 950 | 2.0 |

As shown in Table 1, a very satisfactory tensile strength of over the target level of 400 MPa was exhibited by joints No.1 to 199 (invention examples) which were obtained by liquid phase diffusion bonding wherein the bonding materials were diffusion bonding alloy foils according to the first to fourth inventions and the thirteenth invention.

In contrast, as shown in Table 2, tensile strength of under the target level of 400 MPa, which was completely unsatisfactory, was exhibited by all of the joints No.200 to 212 (comparative examples) which were obtained by liquid phase diffusion bonding wherein the bonding materials were comparison alloy foils with compositions or thicknesses not conforming to the invention.

Specifically, No.200 of the comparative examples was a case where the B content was insufficient and the melting point was over 1300° C., resulting in markedly lower tensile strength, while No.201 was a case where the B content was high and coarse borides were abundantly produced at the alloy side of the bond near the joint, thus reducing the tensile strength of the joint.

No.202 was a case where the Si content was insufficient and the melting point was over 1300° C., resulting in markedly lower tensile strength at the joint, while No.203 was a case where the Si content was in excess and coarse $SiO_2$-based oxides were produced in the insert metal during bonding, thus reducing the tensile strength of the joint.

No.204 was a case where the V content was insufficient so that the oxide film produced on the bonded material alloy surface was not adequately countered and the tensile strength of the joint was reduced, while No.205 was a case where the V content was in excess and the melting point was extremely high, so that liquid phase diffusion bonding could not be adequately accomplished and the tensile strength of the joint was reduced.

No.206 was a case where the abundant presence of Cr resulted in a considerably high melting point so that liquid phase diffusion bonding could not be adequately accomplished and the tensile strength of the joint was reduced, while No.207 was a case where the Mn content was in excess impairing the toughness and reducing the joint tensile strength.

No.208 was a case where the Co content was in excess and coarse intermetallic compounds were produced, reducing the toughness and lowering the tensile strength at the joint, No.209 was a case where the W content was in excess and coarse intermetallic compounds were produced, reducing the toughness and lowering the tensile strength at the joint, and No.210 was a case where the Nb content was in excess, and grain boundary segregation was produced due to overprecipitation of borides, resulting in fragility and reducing the tensile strength at the joint.

No.211 was a case where the Ti content was in excess, and overprecipitation of coarse intermetallic compounds resulted in lower toughness and reduced tensile strength at the joint, and No.212 was a case where the alloy foil thickness was too large, resulting in reduced tensile strength at the joint.

As shown above, liquid phase diffusion bonding using the comparison insert metals which partially satisfied the conditions of the invention but did not satisfy all of those conditions was not able to provide the target joint tensile strength of 400 MPa.

FIGS. 4 to 8 are graphs showing the effects of the components (atomic percent) and thicknesses determined for diffusion bonding alloy foils according to the first to fourth inventions where B was used as the diffusion element, in terms of the relationship between the bonding time and the joint tensile strength (MPa).

Figure 4:
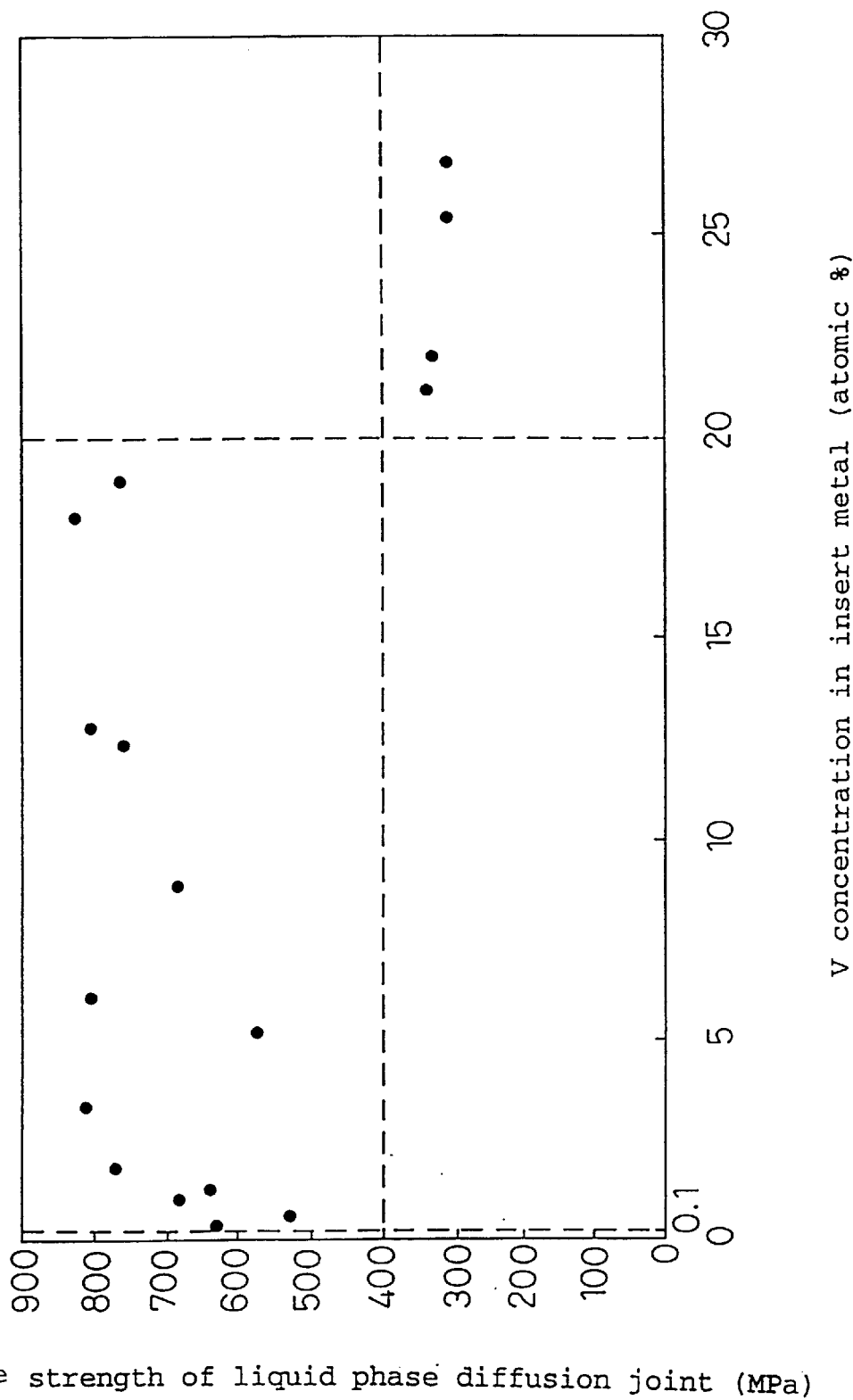
FIG. 4 is a graph showing the relationship between the joint tensile strength and the V content of a Ni-based insert metal for liquid phase diffusion bonding using an Fe-based material as the bonded material.

FIG. 4 shows the effect of the V concentration in the insert metal on the joint tensile strength. When the V concentration is less than 0.1% in terms of atomic percent, the oxide film on the surface of the bonded material alloy surface is not sufficiently countered and therefore the joint tensile strength is reduced, but in a range of 0.1–20.0% in terms of atomic percent, the joint tensile strength is equivalent to or exceeds that of the matrix (bonded material), and the V effectively acts to counter the oxide film. However, if the V content is greater than 20.0 atomic percent the melting point of the insert metal increases so that the bonding time is inadequate and the joint tensile strength is thereby reduced.

Figure 5:
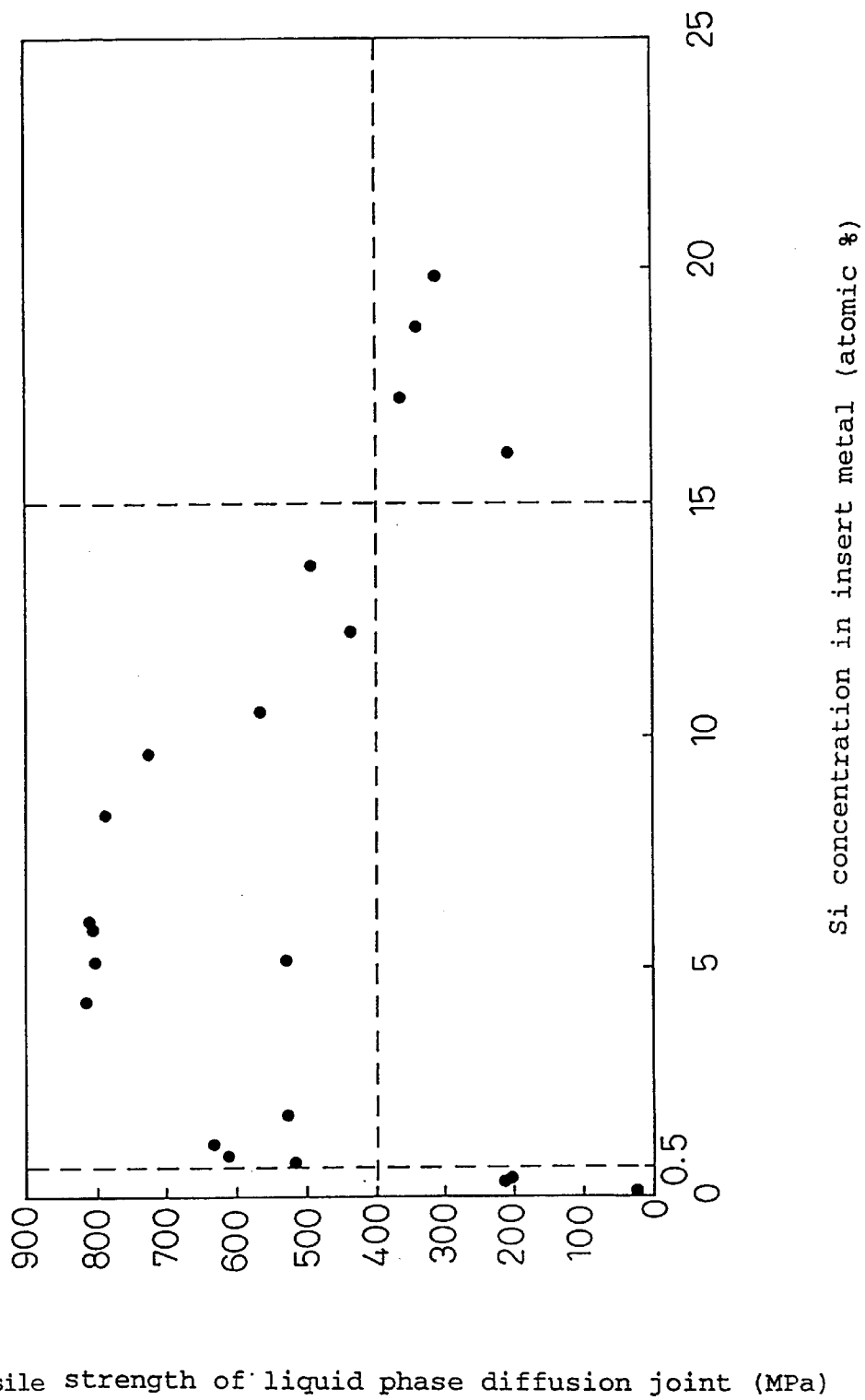
FIG. 5 is a graph showing the relationship between the joint tensile strength and the Si content of a Ni-based insert metal for liquid phase diffusion bonding using an Fe-based material as the bonded material.

FIG. 5 shows a similar relationship between Si and the joint tensile strength. The joint tensile strength is low when Si is less than 0.5% or greater than 15.0%, but high joint tensile strength is obtained when it is from 0.5 to 15.0%.

Figure 6:
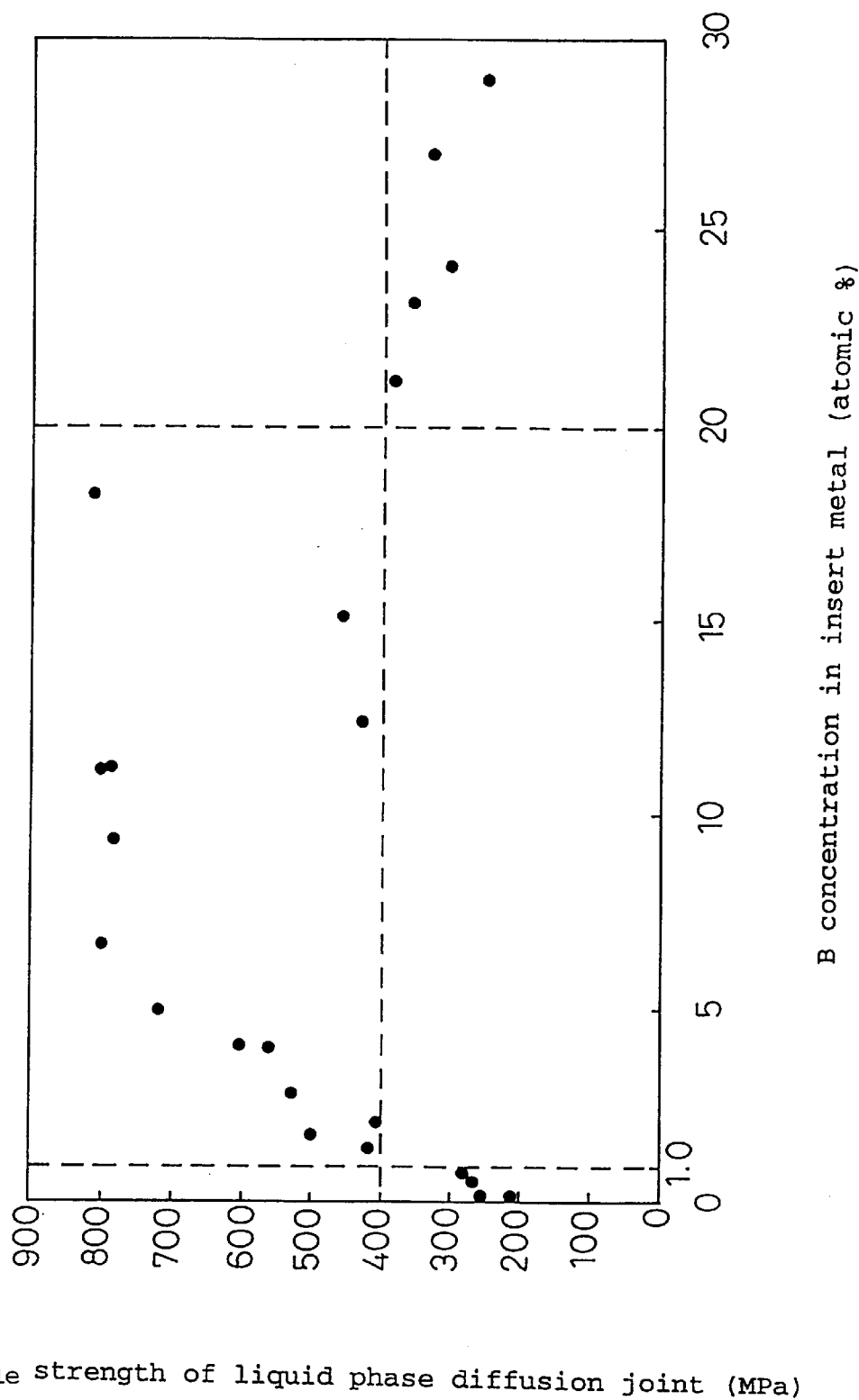
FIG. 6 is a graph showing the relationship between the joint tensile strength and the B content of a Ni-based insert metal for liquid phase diffusion bonding using an Fe-based material as the bonded material.

FIG. 6 shows the relationship between the B concentration in the insert metal and the joint tensile strength.

When B is less than 1.0% the melting point of the insert metal is high, and when it is over 20.0% the borides produced near the bonding interface lower the joint tensile strength. A high joint tensile strength is obtained when B is from 1.0 to ≦20.0%.

Figure 7:
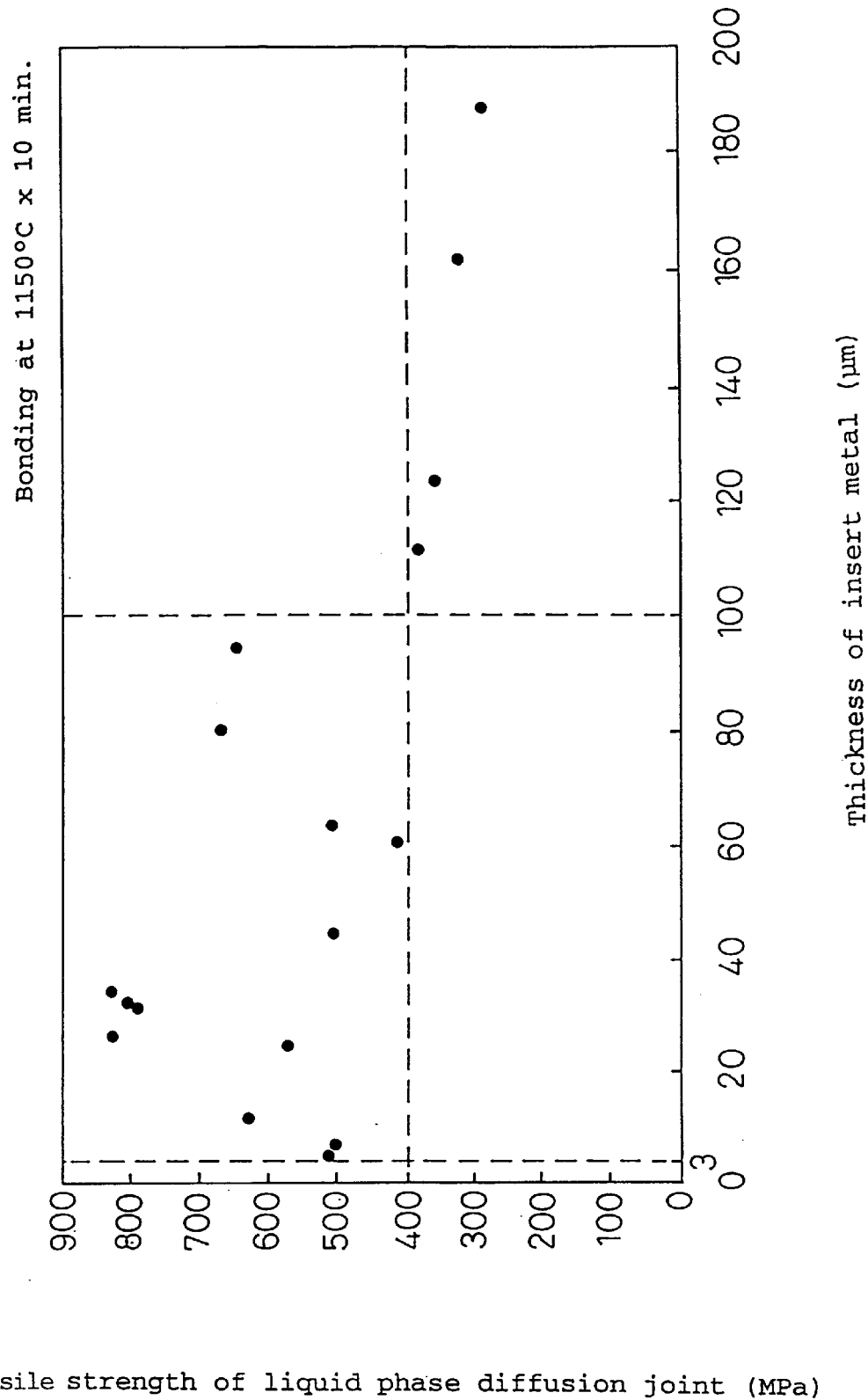
FIG. 7 is a graph showing the relationship between the joint tensile strength and the thickness of a Ni-based insert metal for liquid phase diffusion bonding using an Fe-based material as the bonded material.

FIG. 7 shows the relationship between the thickness of the insert metal and the joint tensile strength. The tensile strength is clearly inadequate with foils of thickness exceeding 100 μm.

Figure 8:
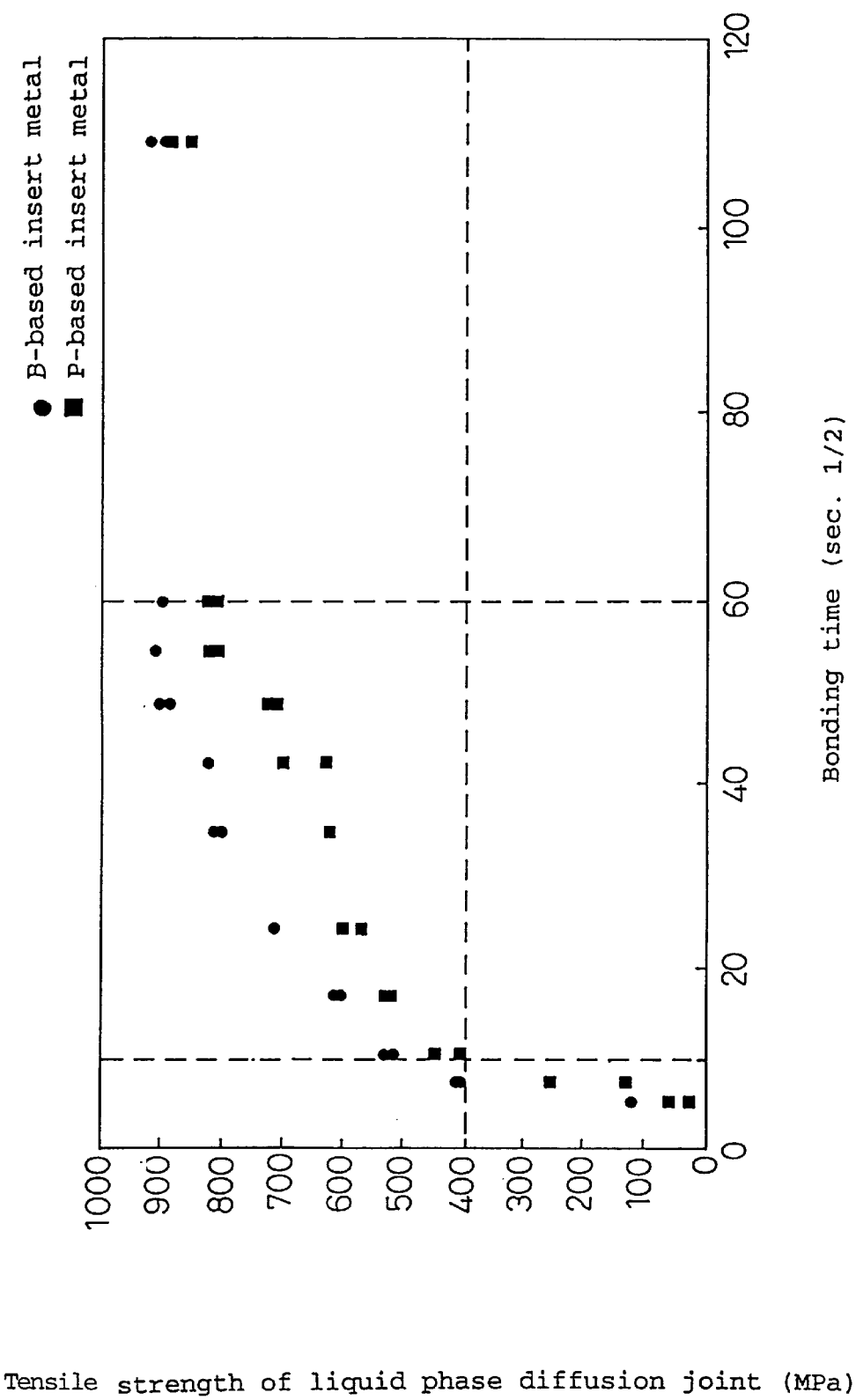
FIG. 8 is a graph showing the relationship between the joint tensile strength and the bonding time of a Ni-based insert metal for liquid phase diffusion bonding using an Fe-based material as the bonded material, also showing a comparison between different cases using a B-based insert metal and a P-based insert metal.

FIG. 8 shows the relationship between the joint tensile strength (MPa) and the bonding time as determined experimentally using B as the diffusion element, with the results compared to using P as the diffusion element. The conditions for the experiment are shown in Tables 3 and 4.

As shown in FIG. 8, Table 3 and Table 4, a higher bonding temperature was required for the invention in which B was used as the diffusion element as compared to using P as the diffusion element, but it was possible to achieve the target joint tensile strength of 400 (MPa) in a shorter time.

Figure 9:
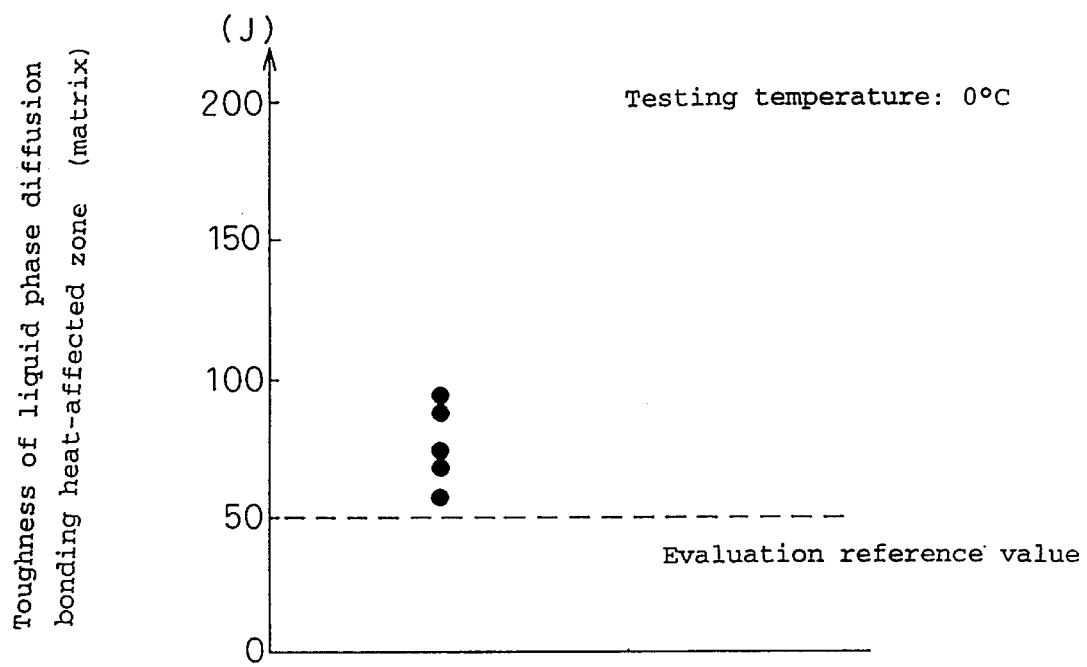
FIG. 9 is a graph showing the toughness of the matrix heat affected zone at a testing temperature of 0° C. after liquid phase diffusion bonding using an Fe-based material as the bonded material.

FIG. 9 is a graph showing the toughness of the matrix heat affected zone at a testing temperature of 0° C. after liquid phase diffusion bonding, and although the toughness is slightly lower compared to using P as the diffusion element whereby bonding was possible at a temperature of 950° C., superior results were obtained at above the evaluation reference value (50 Pa) even when bonding at a temperature of 1050° C. or higher.

Example 2

Embodiments of diffusion bonding alloy foils according to the fifth to eighth inventions and the thirteenth invention, in which P was included as the diffusion element and Si and V as essential components, will now be explained based on Tables 5 and 6 and FIGS. 10 and 11.

TABLE 5-1

| | Chemical components in alloy foil (atomic %) | | | | | | | | | Alloy foil thickness | Bonding | Tensile strength |
|---|---|---|---|---|---|---|---|---|---|---|---|---|
| No. | P | Si | V | Cr | Mo | Co | W | Nb | Ti | (μm) | atmosphere | (MPa) |
| 1 | 19.64 | 0.52 | 16.03 | | | | | | | 72 | air | 530.17 |
| 2 | 16.03 | 12.32 | 8.41 | | | | | | | 54 | air | 492.05 |
| 3 | 14.63 | 7.74 | 8.64 | | | | | | | 86 | air | 493.18 |
| 4 | 13.96 | 4.80 | 3.58 | | | | | | | 87 | air | 467.90 |
| 5 | 6.82 | 11.22 | 16.42 | | | | | | | 85 | air | 532.08 |
| 6 | 17.99 | 12.77 | 17.20 | | | | | | | 100 | air | 536.01 |
| 7 | 15.99 | 1.25 | 7.16 | | | | | | | 48 | air | 485.78 |
| 8 | 4.76 | 3.75 | 7.81 | | | | | | | 21 | air | 489.05 |
| 9 | 9.20 | 4.91 | 2.78 | | | | | | | 44 | air | 463.89 |
| 10 | 11.00 | 0.59 | 12.30 | | | | | | | 16 | air | 511.48 |
| 11 | 10.96 | 6.26 | 13.78 | 5.18 | | | | | | 89 | air | 518.88 |
| 12 | 8.72 | 13.54 | 0.83 | 6.32 | | | | | | 75 | air | 454.17 |
| 13 | 5.03 | 3.86 | 10.53 | 16.00 | | | | | | 100 | air | 502.63 |
| 14 | 16.31 | 13.66 | 8.55 | | 3.06 | | | | | 4 | air | 492.76 |
| 15 | 9.04 | 2.89 | 19.31 | | 6.61 | | | | | 52 | air | 546.53 |
| 16 | 6.65 | 14.00 | 7.08 | | 6.54 | | | | | 70 | air | 485.38 |
| 17 | 14.02 | 7.10 | 9.47 | | | 14.29 | | | | 50 | air | 497.36 |
| 18 | 15.94 | 3.59 | 14.81 | | | 9.43 | | | | 55 | air | 524.04 |
| 19 | 3.65 | 11.92 | 18.30 | | | 7.33 | | | | 43 | air | 541.51 |
| 20 | 17.58 | 14.46 | 1.38 | 16.26 | 7.01 | | | | | 3 | air | 456.91 |
| 21 | 8.52 | 6.94 | 4.91 | 7.64 | 9.76 | | | | | 72 | air | 474.56 |
| 22 | 1.19 | 8.55 | 15.96 | 0.88 | 7.84 | | | | | 84 | air | 529.81 |
| 23 | 17.01 | 3.69 | 13.90 | | 6.98 | 7.79 | | | | 60 | air | 519.50 |
| 24 | 8.80 | 3.57 | 16.86 | | 12.56 | 5.80 | | | | 73 | air | 534.28 |
| 25 | 6.96 | 6.75 | 10.73 | | 12.57 | 1.47 | | | | 96 | air | 503.66 |

TABLE 5-3

| No. | Chemical components in alloy foil (atomic %) | | | | | | | | | Alloy foil thickness (μm) | Bonding atmosphere | Tensile strength (MPa) |
|---|---|---|---|---|---|---|---|---|---|---|---|---|
| | P | Si | V | Cr | Mo | Co | W | Nb | Ti | | | |
| 51 | 2.26 | 2.03 | 9.41 | | | | 9.57 | 6.30 | 7.85 | 20 | air | 699.63 |
| 52 | 12.42 | 6.63 | 19.45 | | | | 1.08 | 0.30 | 2.02 | 5 | air | 576.29 |
| 53 | 14.25 | 12.22 | 13.64 | 3.05 | | | 4.36 | | | 71 | air | 561.80 |
| 54 | 19.58 | 12.84 | 9.29 | 13.96 | | | 9.22 | | | 37 | air | 588.69 |
| 55 | 13.38 | 2.08 | 14.34 | 14.08 | | | 8.41 | | | 49 | air | 605.77 |
| 56 | 9.66 | 11.89 | 4.98 | 5.64 | | | | 0.99 | | 11 | air | 481.82 |
| 57 | 8.99 | 4.70 | 15.29 | 13.66 | | | | 4.70 | | 87 | air | 559.34 |
| 58 | 8.21 | 1.64 | 17.14 | 18.10 | | | | 6.99 | | 42 | air | 584.61 |
| 59 | 5.32 | 7.57 | 12.82 | 0.70 | | | | | 3.82 | 34 | air | 544.62 |
| 60 | 15.32 | 7.00 | 2.63 | 5.02 | | | | | 3.50 | 26 | air | 491.10 |
| 61 | 3.45 | 6.23 | 11.50 | 8.58 | | | | | 0.23 | 39 | air | 509.38 |
| 62 | 13.72 | 3.00 | 4.80 | 2.86 | | | 4.58 | 0.39 | | 80 | air | 522.53 |
| 63 | 4.17 | 14.11 | 5.57 | 13.85 | | | 4.25 | 7.97 | | 77 | air | 576.12 |
| 64 | 14.16 | 6.48 | 8.52 | 8.01 | | | 0.23 | 6.60 | | 52 | air | 541.07 |
| 65 | 6.97 | 7.67 | 16.21 | 15.77 | | | | 0.99 | 5.38 | 24 | air | 581.00 |
| 66 | 8.35 | 12.07 | 16.22 | 9.04 | | | | 3.09 | 7.72 | 89 | air | 614.51 |
| 67 | 15.43 | 0.93 | 17.14 | 19.37 | | | | 0.33 | 8.46 | 98 | air | 605.75 |
| 68 | 9.93 | 7.78 | 16.93 | 12.91 | | | 7.45 | | 7.52 | 64 | air | 669.33 |
| 69 | 10.64 | 1.01 | 15.29 | 0.73 | | | 9.10 | | 8.62 | 40 | air | 686.44 |
| 70 | 9.11 | 3.64 | 2.02 | 5.53 | | | 5.51 | | 6.97 | 23 | air | 570.95 |
| 71 | 13.95 | 11.05 | 7.02 | 6.75 | | | 5.37 | 2.16 | 0.13 | 65 | air | 554.98 |
| 72 | 6.28 | 10.39 | 7.48 | 13.70 | | | 4.79 | 1.36 | 3.02 | 26 | air | 568.93 |
| 73 | 5.09 | 14.75 | 7.94 | 18.02 | | | 3.59 | 7.88 | 0.32 | 93 | air | 583.38 |
| 74 | 13.46 | 8.63 | 5.32 | | 7.06 | | 8.53 | | | 30 | air | 561.93 |
| 75 | 8.45 | 12.76 | 13.73 | | 8.65 | | 2.74 | | | 90 | air | 546.07 |

TABLE 5-4

| No. | Chemical components in alloy foil (atomic %) | | | | | | | | | Alloy foil thickness (μm) | Bonding atmosphere | Tensile strength (MPa) |
|---|---|---|---|---|---|---|---|---|---|---|---|---|
| | P | Si | V | Cr | Mo | Co | W | Nb | Ti | | | |
| 76 | 15.05 | 13.99 | 6.78 | | 2.15 | | 1.64 | | | 48 | air | 500.34 |
| 77 | 6.29 | 8.20 | 7.03 | | 4.16 | | | 4.01 | | 34 | air | 513.17 |
| 78 | 18.53 | 1.38 | 15.01 | | 1.01 | | | 3.31 | | 57 | air | 548.21 |
| 79 | 2.78 | 9.50 | 16.28 | | 1.69 | | | 8.11 | | 86 | air | 588.13 |
| 80 | 2.32 | 10.10 | 17.87 | | 9.12 | | | | 0.34 | 41 | air | 542.09 |
| 81 | 3.48 | 7.70 | 4.65 | | 8.70 | | | | 4.83 | 8 | air | 511.87 |
| 82 | 16.75 | 9.30 | 10.82 | | 12.59 | | | | 4.55 | 92 | air | 540.44 |
| 83 | 7.52 | 10.29 | 9.58 | | 6.11 | | 0.82 | 3.62 | | 74 | air | 531.42 |
| 84 | 9.42 | 6.33 | 1.78 | | 8.79 | | 7.93 | 5.75 | | 61 | air | 578.45 |
| 85 | 9.51 | 4.77 | 14.50 | | 6.82 | | 1.18 | 0.20 | | 43 | air | 535.71 |
| 86 | 15.76 | 13.23 | 7.35 | | 10.55 | | | 0.30 | 7.58 | 72 | air | 549.49 |
| 87 | 7.20 | 13.43 | 4.00 | | 0.60 | | | 3.42 | 6.79 | 55 | air | 548.23 |
| 88 | 4.69 | 12.63 | 15.62 | | 10.65 | | | 0.65 | 3.86 | 44 | air | 563.62 |
| 89 | 7.91 | 4.66 | 16.52 | | 4.56 | | 6.07 | | 0.29 | 42 | air | 595.67 |
| 90 | 10.64 | 5.73 | 9.70 | | 13.64 | | 0.49 | | 1.44 | 53 | air | 514.93 |
| 91 | 11.08 | 12.67 | 4.61 | | 6.79 | | 2.30 | | 4.78 | 79 | air | 534.35 |
| 92 | 16.19 | 10.92 | 6.36 | | 4.71 | | 8.62 | 0.90 | 7.22 | 64 | air | 632.15 |
| 93 | 19.55 | 8.64 | 18.79 | | 1.01 | | 3.50 | 5.75 | 4.19 | 66 | air | 652.66 |
| 94 | 18.07 | 9.64 | 10.67 | | 10.31 | | 7.64 | 6.97 | 6.31 | 53 | air | 679.03 |
| 95 | 5.80 | 0.63 | 17.58 | | | 2.97 | 3.57 | | | 76 | air | 573.57 |
| 96 | 9.06 | 12.65 | 15.07 | | | 2.55 | 6.11 | | | 98 | air | 586.46 |
| 97 | 9.21 | 2.88 | 6.37 | | | 3.45 | 0.34 | | | 22 | air | 485.29 |
| 98 | 6.28 | 0.70 | 6.33 | | | 3.11 | | 1.09 | | 28 | air | 489.31 |
| 99 | 10.08 | 14.65 | 1.89 | | | 1.57 | | 6.27 | | 21 | air | 503.32 |
| 100 | 18.13 | 12.55 | 12.97 | | | 3.51 | | 5.64 | | 26 | air | 554.35 |

TABLE 5-5

| No. | \multicolumn{9}{c|}{Chemical components in alloy foil (atomic %)} | Alloy foil thickness (μm) | Bonding atmosphere | Tensile strength (MPa) |
|---|---|---|---|---|---|---|---|---|---|---|---|---|
|  | P | Si | V | Cr | Mo | Co | W | Nb | Ti |  |  |  |
| 101 | 12.53 | 11.38 | 16.52 |  |  | 1.17 |  |  | 2.50 | 81 | air | 552.57 |
| 102 | 18.57 | 8.99 | 11.54 |  |  | 7.82 |  |  | 1.06 | 100 | air | 516.14 |
| 103 | 6.54 | 13.88 | 12.87 |  |  | 7.12 |  |  | 3.54 | 59 | air | 542.68 |
| 104 | 1.30 | 5.59 | 11.31 |  |  | 7.63 | 8.96 | 4.76 |  | 91 | air | 629.46 |
| 105 | 12.77 | 5.52 | 12.49 |  |  | 0.92 | 3.15 | 4.44 |  | 88 | air | 575.12 |
| 106 | 3.81 | 4.39 | 8.88 |  |  | 14.19 | 2.81 | 6.66 |  | 23 | air | 569.12 |
| 107 | 6.11 | 4.49 | 9.51 |  |  | 4.14 |  | 5.37 | 1.80 | 50 | air | 549.55 |
| 108 | 10.83 | 11.92 | 8.31 |  |  | 12.37 |  | 2.28 | 2.82 | 54 | air | 530.01 |
| 109 | 16.24 | 4.13 | 10.64 |  |  | 14.84 |  | 2.65 | 8.12 | 50 | air | 586.74 |
| 110 | 3.81 | 7.82 | 1.88 |  |  | 6.22 | 3.47 |  | 4.46 | 73 | air | 529.79 |
| 111 | 8.27 | 3.62 | 17.89 |  |  | 10.91 | 1.46 |  | 8.76 | 25 | air | 624.17 |
| 112 | 2.34 | 10.48 | 9.56 |  |  | 2.04 | 9.95 |  | 6.60 | 5 | air | 650.11 |
| 113 | 2.34 | 2.69 | 8.58 |  |  | 8.82 | 4.63 | 4.05 | 0.40 | 91 | air | 570.71 |
| 114 | 9.24 | 0.57 | 8.93 |  |  | 7.36 | 3.69 | 5.69 | 4.84 | 36 | air | 610.05 |
| 115 | 10.05 | 3.87 | 11.59 |  |  | 6.84 | 2.63 | 6.91 | 8.44 | 33 | air | 650.15 |
| 116 | 19.58 | 5.57 | 18.77 | 1.31 | 14.87 |  | 3.15 |  |  | 33 | air | 575.30 |
| 117 | 3.76 | 14.94 | 3.75 | 6.17 | 14.35 |  | 8.32 |  |  | 21 | air | 551.95 |
| 118 | 7.10 | 13.41 | 14.66 | 19.11 | 12.56 |  | 4.12 |  |  | 19 | air | 564.51 |
| 119 | 15.02 | 14.55 | 15.52 | 18.24 | 11.97 |  |  | 9.78 |  | 8 | air | 596.03 |
| 120 | 8.78 | 13.94 | 17.34 | 18.89 | 8.49 |  |  | 9.77 |  | 29 | air | 605.07 |
| 121 | 12.31 | 9.13 | 9.77 | 12.79 | 5.10 |  |  | 2.59 |  | 93 | air | 516.98 |
| 122 | 13.54 | 2.53 | 5.79 | 12.78 | 7.95 |  |  |  | 3.38 | 74 | air | 506.00 |
| 123 | 5.57 | 3.95 | 16.02 | 10.18 | 7.78 |  |  |  | 2.64 | 39 | air | 551.20 |
| 124 | 4.65 | 2.50 | 6.99 | 4.97 | 5.82 |  |  |  | 4.70 | 18 | air | 522.55 |
| 125 | 17.38 | 7.90 | 13.53 | 0.34 | 7.40 |  | 3.02 | 8.41 |  | 28 | air | 606.71 |

TABLE 5-6

| No. | \multicolumn{9}{c|}{Chemical components in alloy foil (atomic %)} | Alloy foil thickness (μm) | Bonding atmosphere | Tensile strength (MPa) |
|---|---|---|---|---|---|---|---|---|---|---|---|---|
|  | P | Si | V | Cr | Mo | Co | W | Nb | Ti |  |  |  |
| 126 | 16.76 | 6.12 | 17.04 | 13.75 | 4.73 |  | 9.07 | 5.40 |  | 15 | air | 663.70 |
| 127 | 1.35 | 13.59 | 16.58 | 16.70 | 6.36 |  | 6.27 | 7.84 |  | 17 | air | 650.51 |
| 128 | 18.08 | 14.63 | 9.32 | 13.13 | 9.89 |  |  | 2.22 | 7.98 | 28 | air | 575.96 |
| 129 | 6.44 | 8.06 | 15.48 | 15.36 | 6.71 |  |  | 0.59 | 7.51 | 24 | air | 591.63 |
| 130 | 13.92 | 13.81 | 3.90 | 0.41 | 12.59 |  |  | 9.96 | 1.71 | 56 | air | 552.91 |
| 131 | 10.80 | 7.55 | 14.05 | 4.54 | 10.04 |  | 9.46 |  | 7.24 | 14 | air | 672.76 |
| 132 | 7.20 | 1.15 | 0.40 | 0.59 | 6.02 |  | 4.14 |  | 6.55 | 95 | air | 545.72 |
| 133 | 16.42 | 9.90 | 11.04 | 12.92 | 3.65 |  | 9.06 |  | 1.10 | 65 | air | 604.58 |
| 134 | 15.64 | 3.97 | 1.01 | 14.36 | 2.85 |  | 9.82 | 8.63 | 4.32 | 72 | air | 648.24 |
| 135 | 15.64 | 2.38 | 5.60 | 1.07 | 0.80 |  | 7.48 | 7.40 | 9.92 | 9 | air | 683.93 |
| 136 | 2.66 | 4.23 | 8.81 | 14.01 | 4.50 |  | 8.91 | 7.16 | 2.52 | 64 | air | 653.41 |
| 137 | 17.69 | 11.06 | 5.49 |  | 14.85 | 9.09 | 0.37 |  |  | 84 | air | 481.11 |
| 138 | 14.74 | 3.67 | 11.79 |  | 12.04 | 0.41 | 9.14 |  |  | 38 | air | 600.34 |
| 139 | 2.68 | 10.85 | 5.00 |  | 4.98 | 7.18 | 0.35 |  |  | 21 | air | 478.47 |
| 140 | 8.69 | 13.71 | 2.60 |  | 14.71 | 2.71 |  | 3.28 |  | 57 | air | 485.95 |
| 141 | 14.46 | 4.62 | 2.58 |  | 2.64 | 3.19 |  | 7.54 |  | 77 | air | 515.68 |
| 142 | 3.09 | 13.57 | 8.98 |  | 9.07 | 5.50 |  | 0.63 |  | 85 | air | 499.34 |
| 143 | 2.69 | 8.77 | 18.85 |  | 9.89 | 14.56 |  |  | 7.70 | 24 | air | 605.86 |
| 144 | 3.52 | 3.90 | 11.44 |  | 13.57 | 14.63 |  |  | 6.80 | 59 | air | 561.62 |
| 145 | 12.92 | 7.31 | 8.51 |  | 6.91 | 8.70 |  |  | 2.19 | 36 | air | 510.06 |
| 146 | 1.17 | 1.60 | 3.27 |  | 13.96 | 1.59 | 1.79 | 5.96 |  | 36 | air | 525.94 |
| 147 | 11.18 | 14.03 | 15.36 |  | 13.61 | 14.03 | 1.19 | 1.71 |  | 5 | air | 550.67 |
| 148 | 12.90 | 3.02 | 9.93 |  | 3.45 | 11.02 | 8.24 | 4.29 |  | 42 | air | 612.09 |
| 149 | 6.15 | 2.42 | 5.97 |  | 1.25 | 13.14 |  | 7.33 | 2.18 | 31 | air | 548.61 |
| 150 | 13.51 | 12.13 | 10.69 |  | 14.29 | 7.69 |  | 7.10 | 6.48 | 7 | air | 604.95 |

TABLE 5-7

| | Chemical components in alloy foil (atomic %) | | | | | | | | Alloy foil thickness | Bonding | Tensile strength |
| --- | --- | --- | --- | --- | --- | --- | --- | --- | --- | --- | --- |
| No. | P | Si | V | Cr | Mo | Co | W | Nb | Ti | ($\mu$m) | atmosphere | (MPa) |
| 151 | 13.65 | 1.81 | 1.19 | | 5.73 | 0.44 | | 7.09 | 1.09 | 40 | air | 514.30 |
| 152 | 5.35 | 7.79 | 14.15 | | 9.30 | 6.26 | 2.02 | | 8.62 | 97 | air | 609.89 |
| 153 | 19.14 | 4.41 | 10.11 | | 1.93 | 5.08 | 7.27 | | 6.63 | 86 | air | 626.31 |
| 154 | 10.62 | 13.53 | 6.14 | | 11.07 | 1.93 | 7.99 | | 4.57 | 16 | air | 597.23 |
| 155 | 1.28 | 1.48 | 19.85 | | 6.36 | 0.19 | 4.93 | 7.55 | 6.71 | 11 | air | 705.06 |
| 156 | 11.06 | 8.61 | 10.50 | | 10.74 | 12.02 | 9.07 | 6.99 | 5.19 | 60 | air | 683.61 |
| 157 | 1.87 | 11.69 | 19.31 | | 1.87 | 6.63 | 6.87 | 3.58 | 2.32 | 48 | air | 658.83 |
| 158 | 11.37 | 4.71 | 16.29 | 14.72 | | 13.85 | 7.84 | | | 16 | air | 609.82 |
| 159 | 12.33 | 10.25 | 9.71 | 19.98 | | 2.21 | 7.35 | | | 7 | air | 572.09 |
| 160 | 5.81 | 1.65 | 11.99 | 0.85 | | 8.20 | 1.25 | | | 7 | air | 522.43 |
| 161 | 16.99 | 6.96 | 16.53 | 17.22 | | 5.08 | | 8.55 | | 6 | air | 592.52 |
| 162 | 6.05 | 2.04 | 13.20 | 12.02 | | 10.91 | | 7.27 | | 57 | air | 566.90 |
| 163 | 17.01 | 3.52 | 6.34 | 15.27 | | 13.03 | | 1.52 | | 43 | air | 492.29 |
| 164 | 1.48 | 9.72 | 4.95 | 17.50 | | 3.95 | | | 3.78 | 86 | air | 504.97 |
| 165 | 17.38 | 4.26 | 6.38 | 18.35 | | 3.89 | | | 5.07 | 32 | air | 522.49 |
| 166 | 19.80 | 6.23 | 7.23 | 4.61 | | 7.07 | | | 5.46 | 42 | air | 529.82 |
| 167 | 4.73 | 11.75 | 5.42 | 11.54 | | 0.14 | 5.85 | 1.98 | | 65 | air | 549.48 |
| 168 | 7.99 | 13.13 | 0.37 | 8.16 | | 4.82 | 7.08 | 9.06 | | 43 | air | 586.01 |
| 169 | 19.98 | 11.97 | 19.43 | 7.20 | | 3.45 | 5.97 | 2.68 | | 66 | air | 625.66 |
| 170 | 10.59 | 3.85 | 14.58 | 9.23 | | 3.94 | | 7.12 | 0.54 | 98 | air | 577.09 |
| 171 | 14.24 | 12.73 | 13.92 | 12.41 | | 3.12 | | 2.98 | 7.78 | 65 | air | 602.75 |
| 172 | 14.35 | 2.43 | 18.93 | 14.17 | | 10.53 | | 1.31 | 7.99 | 26 | air | 617.78 |
| 173 | 4.74 | 3.84 | 15.56 | 13.60 | | 9.72 | 9.88 | | 6.57 | 66 | air | 679.13 |
| 174 | 9.50 | 9.38 | 17.20 | 8.10 | | 6.59 | 1.46 | | 5.08 | 86 | air | 591.21 |
| 175 | 6.60 | 1.68 | 1.49 | 7.11 | | 6.93 | 6.15 | | 1.20 | 4 | air | 528.60 |

TABLE 5-8

| | Chemical components in alloy foil (atomic %) | | | | | | | | Alloy foil thickness | Bonding | Tensile strength |
| --- | --- | --- | --- | --- | --- | --- | --- | --- | --- | --- | --- |
| No. | P | Si | V | Cr | Mo | Co | W | Nb | Ti | ($\mu$m) | atmosphere | (MPa) |
| 176 | 9.73 | 8.53 | 14.54 | 9.36 | | 7.64 | 6.83 | 9.45 | 6.98 | 86 | air | 712.99 |
| 177 | 12.40 | 11.26 | 18.81 | 5.78 | | 2.42 | 0.47 | 5.03 | 4.69 | 37 | air | 621.52 |
| 178 | 19.79 | 6.47 | 0.74 | 2.43 | | 1.28 | 6.19 | 7.18 | 3.66 | 83 | air | 595.16 |
| 179 | 6.64 | 4.79 | 7.74 | 14.68 | 2.16 | 9.93 | 3.29 | | | 27 | air | 521.64 |
| 180 | 1.74 | 13.11 | 11.42 | 11.28 | 7.81 | 9.79 | 7.20 | | | 34 | air | 579.11 |
| 181 | 19.47 | 12.63 | 13.82 | 1.14 | 12.77 | 5.57 | 1.36 | | | 58 | air | 532.63 |
| 182 | 9.20 | 5.38 | 11.50 | 16.07 | 6.90 | 12.74 | | 9.70 | | 68 | air | 575.37 |
| 183 | 17.57 | 5.13 | 15.86 | 10.57 | 8.64 | 7.63 | | 2.37 | | 79 | air | 545.86 |
| 184 | 18.89 | 3.71 | 3.81 | 18.93 | 11.04 | 0.36 | | 9.04 | | 42 | air | 532.33 |
| 185 | 2.69 | 3.07 | 5.73 | 4.77 | 4.48 | 12.62 | | | 1.46 | 83 | air | 490.31 |
| 186 | 4.25 | 14.68 | 8.70 | 5.76 | 5.41 | 9.50 | | | 2.21 | 49 | air | 511.14 |
| 187 | 15.77 | 6.37 | 5.44 | 11.24 | 9.44 | 4.38 | | | 9.27 | 45 | air | 551.41 |
| 188 | 4.53 | 4.79 | 14.17 | 0.74 | 10.60 | 13.46 | 9.83 | 2.84 | | 11 | air | 639.00 |
| 189 | 7.85 | 7.52 | 10.14 | 18.80 | 2.71 | 6.81 | 1.26 | 3.20 | | 40 | air | 535.76 |
| 190 | 3.67 | 0.93 | 2.20 | 11.76 | 1.49 | 10.87 | 4.11 | 7.19 | | 59 | air | 552.37 |
| 191 | 19.77 | 11.97 | 14.98 | 4.24 | 1.08 | 6.30 | | 8.62 | 0.13 | 65 | air | 586.26 |
| 192 | 8.52 | 7.15 | 6.38 | 12.75 | 4.14 | 13.65 | | 2.89 | 3.79 | 93 | air | 532.40 |
| 193 | 2.89 | 1.81 | 8.19 | 7.56 | 5.78 | 6.14 | | 7.92 | 0.44 | 28 | air | 549.89 |
| 194 | 14.11 | 12.77 | 9.97 | 10.77 | 5.22 | 13.32 | 8.84 | | 4.05 | 47 | air | 620.59 |
| 195 | 15.49 | 3.20 | 10.69 | 9.66 | 5.73 | 2.31 | 3.41 | | 4.90 | 42 | air | 576.72 |
| 196 | 3.00 | 8.22 | 19.26 | 1.03 | 0.73 | 3.50 | 1.47 | | 5.11 | 98 | air | 601.81 |
| 197 | 13.54 | 2.11 | 13.29 | 11.45 | 7.66 | 8.89 | 6.41 | 1.44 | 8.13 | 76 | air | 655.67 |
| 198 | 8.50 | 9.16 | 19.57 | 5.90 | 11.33 | 1.38 | 2.96 | 9.35 | 1.37 | 16 | air | 653.85 |
| 199 | 2.55 | 9.46 | 18.98 | 3.91 | 7.12 | 3.24 | 8.21 | 9.23 | 4.31 | 70 | air | 726.02 |

TABLE 6

| | Chemical components in alloy foil (atomic %) | | | | | | | | Alloy foil thickness | Bonding | Tensile strength |
|---|---|---|---|---|---|---|---|---|---|---|---|
| No. | P | Si | V | Cr | Mo | Co | W | Nb | Ti | (μm) | atmosphere | (MPa) |
| 200 | 0.31 | 13.64 | 10.02 | | | | | | | 12.33 | air | 0.05 |
| 201 | 24.97 | 6.80 | 14.24 | | | | | | | 21.30 | air | 179.06 |
| 202 | 17.42 | 0.04 | 17.01 | | | | | | | 78.35 | air | 0.31 |
| 203 | 12.53 | 18.16 | 4.62 | | | | | | | 5.16 | air | 327.19 |
| 204 | 13.09 | 7.95 | 0.05 | | | | | | | 69.57 | air | 0.02 |
| 205 | 14.09 | 12.55 | 22.95 | | | | | | | 24.15 | air | 341.91 |
| 206 | 5.78 | 10.44 | 10.91 | 23.15 | | | | | | 64.65 | air | 123.71 |
| 207 | 5.14 | 6.90 | 8.07 | | 19.93 | | | | | 40.54 | air | 117.93 |
| 208 | 9.65 | 14.36 | 1.07 | | | 18.71 | | | | 42.86 | air | 198.49 |
| 209 | 4.86 | 13.47 | 19.18 | | | | 14.52 | | | 90.92 | air | 145.05 |
| 210 | 1.86 | 14.78 | 18.05 | | | | | 16.17 | | 11.11 | air | 180.77 |
| 211 | 2.40 | 9.99 | 13.40 | 11.21 | 1.57 | 2.95 | | | 14.44 | 84.27 | air | 214.24 |
| 212 | 15.51 | 6.32 | 13.93 | | 8.15 | | 6.16 | | | 133.74 | air | 258.07 |

As shown in Table 5, a very satisfactory tensile strength of over the target level of 400 MPa was exhibited by joints No.1 to 199 (invention examples) which were obtained by liquid phase diffusion bonding wherein the bonding materials were diffusion bonding alloy foils according to the fifth to eighth inventions and the thirteenth invention.

In contrast, as shown in Table 6, tensile strength of under the target level of 400 MPa, which was completely unsatisfactory, was exhibited by all of the joints No.200 to 212 (comparative examples) which were obtained by liquid phase diffusion bonding wherein the bonding materials were comparison alloy foils with compositions or thicknesses not conforming to the invention.

Specifically, No.200 of the comparative examples was a case where the P content was insufficient and the melting point was over 1300° C., resulting in markedly lower tensile strength, while No.201 was a case where the P content was high and coarse borides were abundantly produced at the alloy side of the bond near the joint, thus reducing the tensile strength of the joint.

No.202 was a case where the Si content was insufficient and the melting point was over 1300° C., resulting in markedly lower tensile strength at the joint, while No.203 was a case where the Si content was in excess and coarse SiO$_2$-based oxides were produced in the insert metal during bonding, thus reducing the tensile strength of the joint.

No.204 was a case where the V content was insufficient so that the oxide film produced on the bonded material alloy surface was not adequately countered and the tensile strength of the joint was reduced, while No.205 was a case where the V content was in excess and the melting point was extremely high, so that liquid phase diffusion bonding could not be adequately accomplished and the tensile strength of the joint was reduced.

No.206 was a case where Cr was abundantly present resulting in a considerably high melting point so that liquid phase diffusion bonding could not be adequately accomplished and the tensile strength of the joint was reduced, while No.207 was a case where the Mo content was in excess impairing the toughness and reducing the joint strength.

No.208 was a case where the Co content was in excess and coarse intermetallic compounds were produced, reducing the toughness and lowering the tensile strength at the joint, No.209 was a case where the W content was in excess and coarse intermetallic compounds were produced, reducing the toughness and lowering the tensile strength at the joint, and No.210 was a case where the Nb content was in excess, and grain boundary segregation was produced due to overproduction of borides, resulting in fragility and reducing the tensile strength at the joint.

No.211 was a case where the Ti content was in excess, and overprecipitation of coarse intermetallic compounds resulted in lower toughness and reduced tensile strength at the joint, and No.212 was a case where the alloy foil thickness was too large, resulting in reduced tensile strength at the joint.

As shown above, liquid phase diffusion bonding using the comparison insert metals which partially satisfied the conditions of the invention but did not satisfy all of those conditions was not able to provide the target joint tensile strength of 400 MPa.

Figure 10:
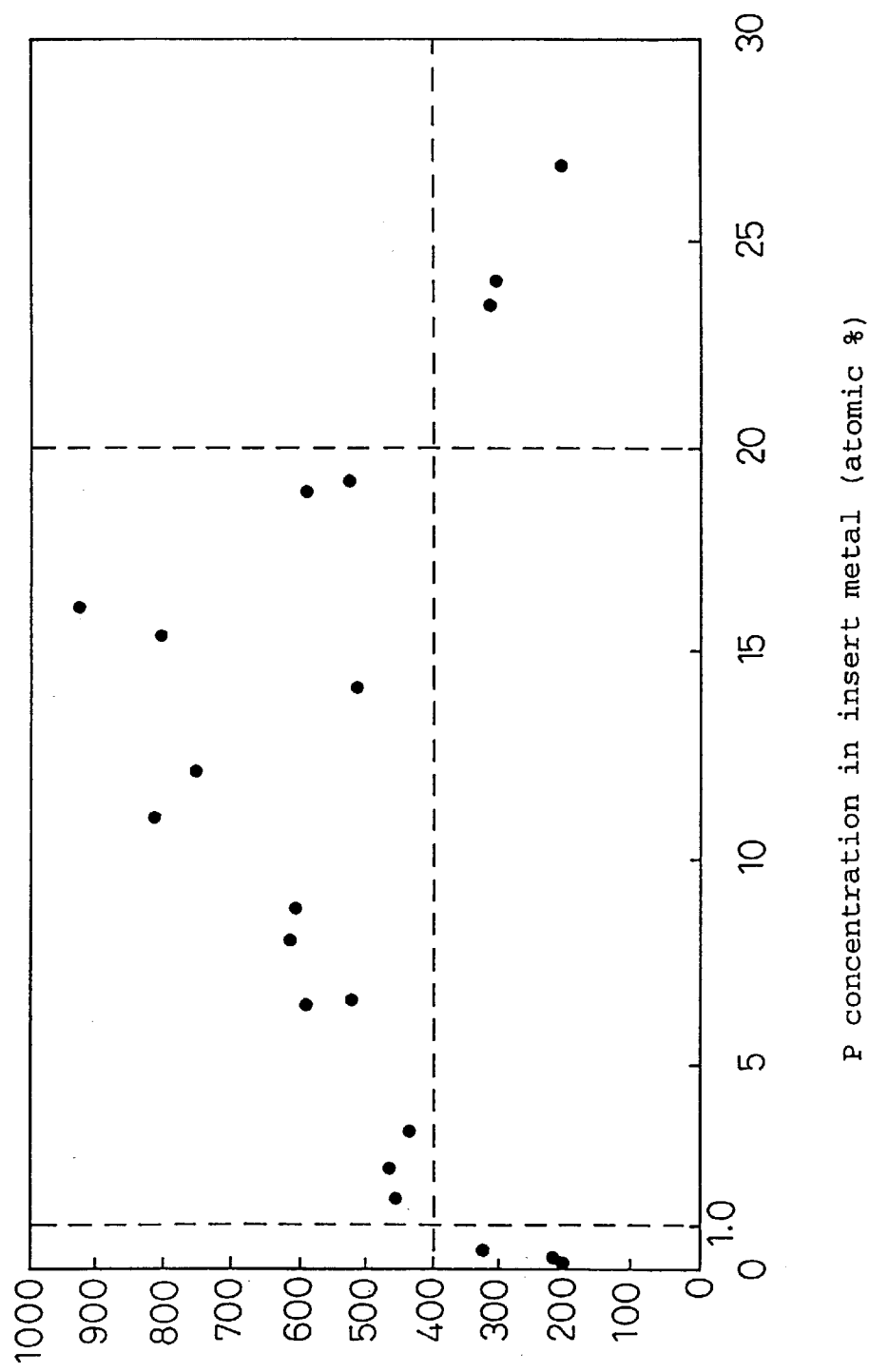
FIG. 10 is a graph showing the relationship between the joint tensile strength and the P content of a Ni-based insert metal for liquid phase diffusion bonding using an Fe-based material as the bonded material.

FIG. 10 confirms the relationship between the P concentration in the insert metal as determined for diffusion bonding alloy foils according to the fifth to eighth inventions and the joint tensile strength (MPa), showing that when P is less than 1.0% the melting point of the insert metal is high, and when it is over 20.0% the phosphides produced near the bonding interface lower the joint tensile strength. A high joint tensile strength is obtained when P is from 1.0–20.0%.

Figure 11:
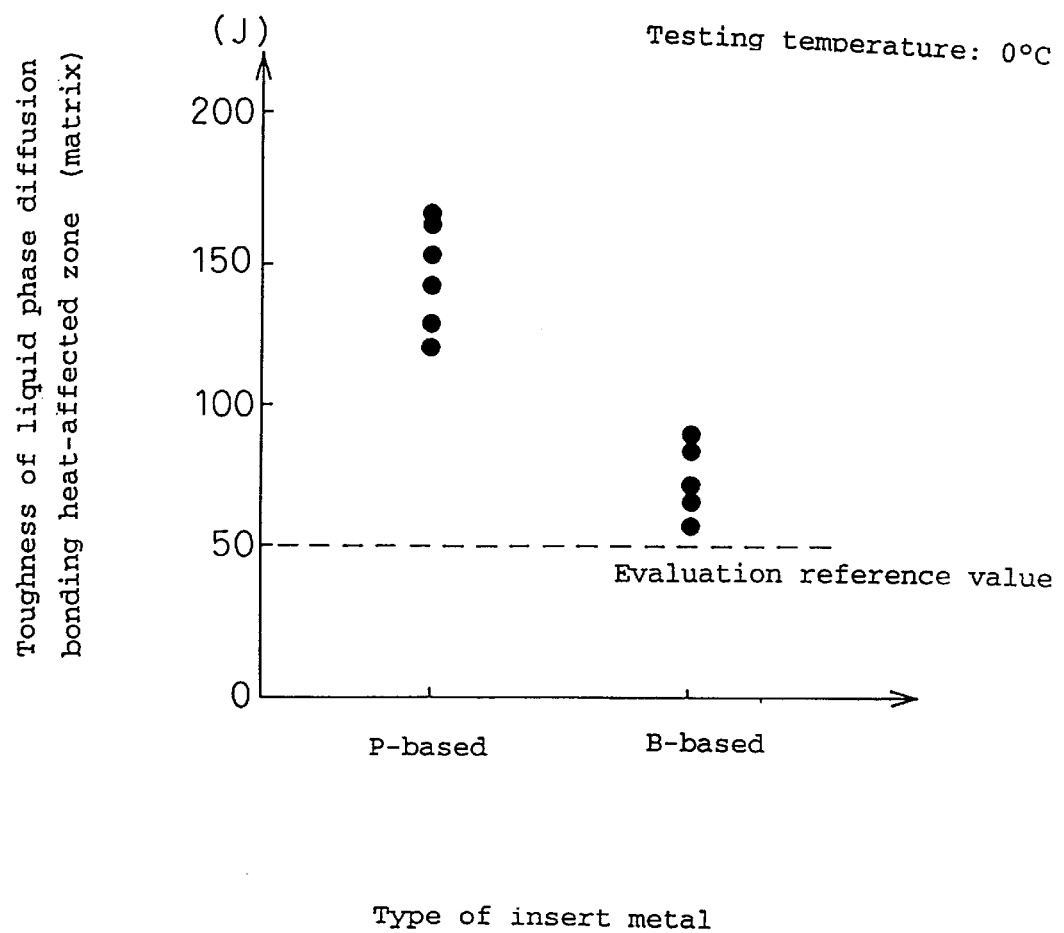
FIG. 11 is a graph showing the toughness of the matrix heat affected zone at a testing temperature of 0° C. after liquid phase diffusion bonding using an Fe-based material as the bonded material, also showing a comparison between different cases using a B-based insert metal and a P-based insert metal.

FIG. 11 is a graph showing the comparative toughness (J) of the matrix heat affected zone at a testing temperature of 0° C. with present invention insert metals using P as the diffusion element and present invention insert metals using B as the diffusion element; when P was used as the diffusion element bonding was possible at a temperature of 950° C., so that coarse crystal grains were adequately prevented at the matrix heat affected zone and products with high toughness were obtained.

The relationship between the joint tensile strength and the V concentration of the insert metal was substantially no different from FIG. 4, the relationship between Si and the joint tensile strength was substantially no different from FIG. 5, and the relationship between the insert metal thickness and the joint tensile strength was substantially no different from FIG. 7, and these are therefore not shown.

The relationship between the joint tensile strength (MPa) and the bonding time in comparison with the invention insert metals using B as the diffusion element were roughly the same as FIG. 8, Table 3 and Table 4, and these are therefore not shown or listed.

Example 3

Embodiments of diffusion bonding alloy foils according to the ninth to twelfth inventions and the thirteenth invention, in which P and B were included as the diffusion elements and Si and V as essential components, will now be explained based on Tables 7 and 8 and FIGS. 12, 13 and 14.

TABLE 7-1

| No. | B | P | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|---|
| 1 | 16.99 | 11.99 | 6.14 | 10.93 | | | | | | | 20 | air | 504.64 |
| 2 | 6.05 | 2.05 | 9.00 | 4.85 | | | | | | | 67 | air | 474.24 |
| 3 | 19.78 | 9.96 | 4.37 | 8.25 | | | | | | | 83 | air | 491.23 |
| 4 | 2.97 | 6.82 | 9.29 | 14.72 | | | | | | | 77 | air | 523.58 |
| 5 | 2.83 | 7.99 | 2.71 | 14.56 | | | | | | | 88 | air | 522.82 |
| 6 | 19.04 | 19.73 | 9.37 | 11.67 | | | | | | | 80 | air | 508.34 |
| 7 | 17.54 | 4.69 | 2.05 | 14.31 | | | | | | | 26 | air | 521.55 |
| 8 | 11.06 | 19.53 | 3.33 | 11.77 | | | | | | | 25 | air | 508.84 |
| 9 | 18.18 | 17.47 | 7.52 | 5.94 | | | | | | | 91 | air | 479.70 |
| 10 | 6.31 | 13.65 | 4.75 | 13.96 | | | | | | | 18 | air | 519.82 |
| 11 | 7.59 | 17.26 | 7.66 | 9.15 | 6.28 | | | | | | 28 | air | 495.73 |
| 12 | 9.55 | 10.63 | 9.45 | 12.46 | 17.88 | | | | | | 12 | air | 512.28 |
| 13 | 3.36 | 8.08 | 6.81 | 12.75 | 17.81 | | | | | | 66 | air | 513.77 |
| 14 | 18.85 | 14.52 | 8.41 | 9.30 | | 7.45 | | | | | 29 | air | 496.51 |
| 15 | 10.91 | 11.00 | 7.70 | 12.37 | | 3.43 | | | | | 25 | air | 511.87 |
| 16 | 12.45 | 6.92 | 7.97 | 13.04 | | 0.34 | | | | | 10 | air | 515.22 |
| 17 | 1.18 | 6.76 | 8.55 | 2.73 | | | 3.56 | | | | 11 | air | 463.65 |
| 18 | 7.86 | 7.41 | 4.11 | 7.15 | | | 7.82 | | | | 66 | air | 485.73 |
| 19 | 18.63 | 6.35 | 8.46 | 7.23 | | | 5.57 | | | | 20 | air | 486.13 |
| 20 | 1.34 | 2.37 | 2.27 | 13.05 | 6.39 | 8.57 | | | | | 78 | air | 515.26 |
| 21 | 11.94 | 8.89 | 9.24 | 7.85 | 10.25 | 3.81 | | | | | 80 | air | 489.26 |
| 22 | 14.56 | 6.06 | 9.55 | 1.72 | 18.75 | 5.83 | | | | | 71 | air | 458.60 |
| 23 | 3.07 | 18.38 | 7.23 | 5.32 | | 3.96 | 12.05 | | | | 62 | air | 476.62 |
| 24 | 7.59 | 3.52 | 8.97 | 5.54 | | 9.28 | 11.03 | | | | 100 | air | 477.69 |
| 25 | 11.25 | 19.09 | 8.10 | 14.13 | | 8.51 | 6.19 | | | | 15 | air | 520.67 |

TABLE 7-2

| No. | B | P | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|---|
| 26 | 3.18 | 16.03 | 2.12 | 11.90 | 4.74 | | 6.73 | | | | 97 | air | 509.52 |
| 27 | 17.47 | 7.30 | 2.04 | 5.49 | 6.97 | | 5.94 | | | | 89 | air | 477.43 |
| 28 | 2.39 | 7.43 | 4.47 | 15.94 | 18.84 | | 11.98 | | | | 67 | air | 529.71 |
| 29 | 6.60 | 14.89 | 5.62 | 11.97 | 5.36 | 0.60 | 14.56 | | | | 61 | air | 509.84 |
| 30 | 17.69 | 14.51 | 4.49 | 3.47 | 15.65 | 9.85 | 5.98 | | | | 81 | air | 467.37 |
| 31 | 1.95 | 9.88 | 2.55 | 6.41 | 9.27 | 9.94 | 10.51 | | | | 36 | air | 482.05 |
| 32 | 19.16 | 6.39 | 8.05 | 15.81 | | | | 8.50 | | | 30 | air | 614.02 |
| 33 | 3.52 | 10.90 | 5.80 | 10.30 | | | | 8.89 | | | 24 | air | 590.42 |
| 34 | 17.89 | 17.16 | 3.72 | 17.99 | | | | 4.97 | | | 21 | air | 589.63 |
| 35 | 18.34 | 3.11 | 9.85 | 18.46 | | | | | 0.67 | | 37 | air | 547.03 |
| 36 | 15.28 | 10.73 | 4.69 | 19.66 | | | | | 5.48 | | 17 | air | 586.65 |
| 37 | 2.51 | 12.09 | 3.30 | 0.75 | | | | | 0.57 | | 17 | air | 457.76 |
| 38 | 12.88 | 13.28 | 2.76 | 5.08 | | | | | | 1.43 | 76 | air | 486.79 |
| 39 | 2.61 | 16.01 | 5.62 | 12.44 | | | | | | 0.49 | 45 | air | 516.12 |
| 40 | 16.89 | 10.01 | 8.24 | 2.53 | | | | | | 0.93 | 94 | air | 470.10 |
| 41 | 15.05 | 15.98 | 7.50 | 13.67 | | | | 4.54 | 0.70 | | 22 | air | 568.66 |
| 42 | 8.88 | 15.51 | 8.74 | 11.51 | | | | 0.74 | 0.55 | | 55 | air | 518.79 |
| 43 | 15.69 | 5.69 | 1.24 | 4.27 | | | | 4.22 | 9.81 | | 86 | air | 582.19 |
| 44 | 3.38 | 10.15 | 9.68 | 17.49 | | | | | 4.44 | 4.29 | 71 | air | 602.90 |
| 45 | 16.92 | 14.90 | 5.75 | 3.55 | | | | | 8.84 | 1.67 | 94 | air | 542.98 |
| 46 | 12.70 | 12.52 | 4.74 | 3.38 | | | | | 3.49 | 2.04 | 3 | air | 507.61 |
| 47 | 1.23 | 13.36 | 5.31 | 15.46 | | | | 9.95 | | 2.47 | 59 | air | 646.51 |
| 48 | 11.49 | 7.96 | 4.34 | 9.52 | | | | 2.64 | | 5.41 | 69 | air | 567.33 |
| 49 | 19.38 | 9.91 | 2.69 | 15.27 | | | | 6.42 | | 1.24 | 54 | air | 600.46 |
| 50 | 19.96 | 19.78 | 4.30 | 1.39 | | | | 6.15 | 9.68 | 5.02 | 45 | air | 626.33 |

TABLE 7-3

| No. | \multicolumn{9}{c|}{Chemical components in alloy foil (atomic %)} | Alloy foil thickness (μm) | Bonding atmosphere | Tensile strength (MPa) |

| No. | B | P | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|---|
| 51 | 14.65 | 17.05 | 9.99 | 4.11 | | | | 9.76 | 4.17 | 9.48 | 99 | air | 673.16 |
| 52 | 7.51 | 7.76 | 3.11 | 18.35 | | | | 0.88 | 9.49 | 4.92 | 14 | air | 656.21 |
| 53 | 2.49 | 17.24 | 6.85 | 16.73 | 18.88 | | | 8.49 | | | 31 | air | 618.55 |
| 54 | 5.22 | 1.74 | 6.97 | 10.55 | 10.78 | | | 0.75 | | | 6 | air | 510.28 |
| 55 | 13.88 | 17.58 | 3.92 | 16.32 | 17.21 | | | 9.09 | | | 14 | air | 622.46 |
| 56 | 13.69 | 3.62 | 9.11 | 2.17 | 10.02 | | | | 7.83 | | 41 | air | 515.66 |
| 57 | 15.30 | 6.30 | 4.28 | 1.05 | 17.25 | | | | 5.25 | | 70 | air | 491.99 |
| 58 | 4.95 | 13.39 | 9.24 | 1.02 | 4.17 | | | | 0.52 | | 72 | air | 458.71 |
| 59 | 9.69 | 17.31 | 5.52 | 3.99 | 18.32 | | | | | 5.44 | 20 | air | 513.52 |
| 60 | 9.41 | 14.20 | 0.75 | 11.20 | 7.81 | | | | | 8.20 | 56 | air | 571.54 |
| 61 | 4.65 | 13.59 | 9.47 | 12.29 | 15.60 | | | | | 4.68 | 92 | air | 548.87 |
| 62 | 9.53 | 12.50 | 3.41 | 14.55 | 9.45 | | | 4.72 | 6.43 | | 82 | air | 615.00 |
| 63 | 12.24 | 14.57 | 3.39 | 10.30 | 17.60 | | | 2.97 | 7.66 | | 67 | air | 584.83 |
| 64 | 5.89 | 17.74 | 4.83 | 8.67 | 15.68 | | | 8.81 | 6.08 | | 36 | air | 624.03 |
| 65 | 7.74 | 19.39 | 7.24 | 1.64 | 13.28 | | | | 7.87 | 8.57 | 23 | air | 581.87 |
| 66 | 9.19 | 15.60 | 4.20 | 19.31 | 13.70 | | | | 3.62 | 4.63 | 47 | air | 608.96 |
| 67 | 1.95 | 13.45 | 1.72 | 2.89 | 18.95 | | | | 4.73 | 8.22 | 81 | air | 563.31 |
| 68 | 3.81 | 19.87 | 6.07 | 14.12 | 0.23 | | | 1.60 | | 3.98 | 35 | air | 568.45 |
| 69 | 16.69 | 15.11 | 8.95 | 13.22 | 4.83 | | | 2.57 | | 2.65 | 69 | air | 562.99 |
| 70 | 9.14 | 9.46 | 7.30 | 0.85 | 15.51 | | | 6.49 | | 5.93 | 77 | air | 566.53 |
| 71 | 17.33 | 19.90 | 1.82 | 0.24 | 15.28 | | | 3.60 | 9.36 | 7.63 | 67 | air | 613.77 |
| 72 | 18.78 | 6.24 | 4.37 | 10.92 | 0.92 | | | 5.42 | 5.80 | 1.23 | 15 | air | 609.26 |
| 73 | 16.24 | 4.07 | 2.96 | 9.45 | 11.62 | | | 8.20 | 0.66 | 0.16 | 17 | air | 585.14 |
| 74 | 18.14 | 4.08 | 9.57 | 2.44 | | 7.44 | | 7.98 | | | 18 | air | 542.04 |
| 75 | 17.36 | 9.40 | 5.01 | 13.40 | | 6.08 | | 3.34 | | | 26 | air | 550.42 |

TABLE 7-4

| No. | B | P | Si | V | Cr | Mn | Co | W | Nb | Ti | Alloy foil thickness (μm) | Bonding atmosphere | Tensile strength (MPa) |
|---|---|---|---|---|---|---|---|---|---|---|---|---|---|
| 76 | 9.20 | 4.73 | 7.61 | 13.78 | | 5.47 | | 1.64 | | | 56 | air | 535.33 |
| 77 | 7.32 | 17.71 | 2.24 | 8.99 | | 1.31 | | | 2.17 | | 49 | air | 510.14 |
| 78 | 18.07 | 7.23 | 6.18 | 0.26 | | 9.46 | | | 1.92 | | 67 | air | 464.76 |
| 79 | 3.43 | 15.34 | 7.53 | 9.70 | | 8.50 | | | 8.55 | | 61 | air | 558.34 |
| 80 | 1.47 | 19.33 | 6.67 | 18.48 | | 8.30 | | | | 1.72 | 95 | air | 556.15 |
| 81 | 3.60 | 16.83 | 2.47 | 5.25 | | 8.12 | | | | 1.58 | 24 | air | 488.85 |
| 82 | 17.94 | 19.67 | 1.86 | 10.36 | | 6.25 | | | | 1.51 | 48 | air | 513.90 |
| 83 | 12.68 | 15.99 | 0.60 | 4.62 | | 5.47 | | 3.58 | 5.41 | | 44 | air | 546.79 |
| 84 | 18.37 | 12.70 | 3.53 | 15.91 | | 8.76 | | 4.78 | 5.19 | | 56 | air | 613.73 |
| 85 | 12.47 | 12.90 | 8.13 | 11.27 | | 2.09 | | 6.76 | 7.20 | | 87 | air | 624.32 |
| 86 | 1.47 | 19.11 | 3.44 | 7.56 | | 6.35 | | | 2.62 | 7.89 | 30 | air | 569.24 |
| 87 | 14.28 | 3.76 | 1.30 | 11.96 | | 1.31 | | | 4.22 | 9.65 | 51 | air | 616.55 |
| 88 | 11.91 | 2.74 | 1.41 | 0.16 | | 7.74 | | | 0.51 | 5.69 | 77 | air | 499.93 |
| 89 | 11.40 | 2.08 | 6.50 | 13.11 | | 1.82 | | 0.87 | | 7.47 | 33 | air | 583.97 |
| 90 | 17.92 | 12.85 | 0.72 | 11.13 | | 4.44 | | 3.98 | | 2.69 | 87 | air | 566.99 |
| 91 | 9.01 | 13.58 | 7.81 | 13.62 | | 0.13 | | 7.23 | | 8.52 | 97 | air | 658.52 |
| 92 | 13.93 | 14.91 | 9.77 | 6.62 | | 2.59 | | 8.36 | 6.67 | 1.57 | 42 | air | 625.96 |
| 93 | 5.45 | 1.85 | 4.42 | 1.23 | | 6.91 | | 4.96 | 5.89 | 2.94 | 51 | air | 570.48 |
| 94 | 1.29 | 16.86 | 9.24 | 2.32 | | 2.37 | | 3.82 | 0.28 | 0.98 | 86 | air | 509.61 |
| 95 | 9.00 | 13.13 | 6.12 | 19.73 | | | 10.42 | 4.02 | | | 33 | air | 588.81 |
| 96 | 6.53 | 11.68 | 4.10 | 2.65 | | | 6.36 | 8.39 | | | 49 | air | 547.12 |
| 97 | 15.09 | 1.86 | 2.60 | 18.12 | | | 7.78 | 4.93 | | | 12 | air | 589.93 |
| 98 | 11.44 | 16.51 | 0.84 | 5.65 | | | 1.67 | | 2.54 | | 82 | air | 496.00 |
| 99 | 3.63 | 1.00 | 0.56 | 0.52 | | | 8.57 | | 4.55 | | 70 | air | 484.47 |
| 100 | 6.52 | 9.23 | 6.33 | 6.60 | | | 9.96 | | 0.61 | | 22 | air | 487.26 |

TABLE 7-5

| No. | \multicolumn{10}{c}{Chemical components in alloy foil (atomic %)} | Alloy foil thickness (μm) | Bonding atmosphere | Tensile strength (MPa) |

| No. | B | P | Si | V | Cr | Mn | Co | W | Nb | Ti | Alloy foil thickness (μm) | Bonding atmosphere | Tensile strength (MPa) |
|-----|---|---|----|---|----|----|----|---|----|----|---------------------------|--------------------|------------------------|
| 101 | 3.57 | 17.61 | 1.63 | 16.35 | | | 10.93 | | | 1.15 | 75 | air | 540.93 |
| 102 | 4.96 | 15.89 | 2.87 | 13.47 | | | 8.31 | | 6.49 | | 88 | air | 569.26 |
| 103 | 5.38 | 5.49 | 4.87 | 16.62 | | | 13.95 | | | 3.24 | 59 | air | 559.02 |
| 104 | 15.03 | 10.74 | 6.63 | 19.62 | | | 10.35 | 9.38 | 6.66 | | 55 | air | 688.51 |
| 105 | 13.19 | 2.93 | 8.98 | 8.72 | | | 1.58 | 1.72 | 3.87 | | 75 | air | 537.89 |
| 106 | 7.27 | 17.73 | 3.84 | 10.08 | | | 12.59 | 9.10 | 2.14 | | 49 | air | 606.34 |
| 107 | 9.52 | 14.60 | 3.44 | 6.98 | | | 14.46 | | 3.79 | 7.46 | 15 | air | 570.87 |
| 108 | 2.80 | 17.79 | 4.87 | 18.68 | | | 8.95 | | 7.36 | 3.80 | 8 | air | 625.31 |
| 109 | 15.91 | 15.06 | 5.32 | 13.04 | | | 9.38 | | 0.64 | 3.94 | 29 | air | 551.21 |
| 110 | 9.82 | 16.22 | 8.75 | 9.66 | | | 14.40 | 4.87 | | 1.65 | 19 | air | 560.14 |
| 111 | 14.22 | 5.12 | 2.69 | 14.79 | | | 5.44 | 9.60 | | 3.12 | 70 | air | 644.87 |
| 112 | 18.96 | 16.82 | 4.17 | 2.30 | | | 10.55 | 7.54 | | 8.12 | 38 | air | 601.89 |
| 113 | 18.34 | 8.63 | 7.87 | 5.27 | | | 9.75 | 3.76 | 6.45 | 2.99 | 55 | air | 583.00 |
| 114 | 12.19 | 11.54 | 3.22 | 2.33 | | | 14.66 | 8.38 | 6.17 | 9.84 | 70 | air | 667.30 |
| 115 | 5.58 | 10.59 | 3.09 | 17.36 | | | 13.08 | 9.98 | 8.95 | 1.84 | 15 | air | 714.03 |
| 116 | 13.81 | 2.15 | 1.15 | 11.00 | 9.14 | 6.68 | | 5.80 | | | 71 | air | 562.98 |
| 117 | 2.99 | 13.31 | 3.59 | 3.98 | 10.94 | 5.63 | | 7.72 | | | 4 | air | 547.06 |
| 118 | 4.27 | 12.37 | 8.72 | 17.23 | 1.49 | 1.66 | | 3.21 | | | 34 | air | 568.22 |
| 119 | 14.44 | 12.65 | 6.63 | 17.94 | 12.18 | 0.79 | | | 0.23 | | 43 | air | 541.32 |
| 120 | 3.10 | 3.60 | 1.32 | 6.06 | 15.19 | 4.56 | | | 5.77 | | 74 | air | 520.71 |
| 121 | 3.37 | 5.47 | 7.89 | 0.30 | 9.35 | 9.30 | | | 0.64 | | 44 | air | 456.01 |
| 122 | 4.69 | 9.49 | 4.72 | 16.59 | 9.20 | 4.93 | | | | 2.49 | 52 | air | 552.90 |
| 123 | 16.36 | 18.10 | 9.35 | 5.59 | 16.25 | 1.27 | | | | 6.67 | 38 | air | 531.29 |
| 124 | 18.74 | 19.92 | 4.79 | 16.32 | 13.03 | 0.40 | | | | 5.44 | 54 | air | 575.11 |
| 125 | 16.62 | 13.90 | 4.32 | 14.18 | 17.42 | 5.92 | | 8.53 | 4.20 | | 88 | air | 635.66 |

TABLE 7-6

| No. | B | P | Si | V | Cr | Mn | Co | W | Nb | Ti | Alloy foil thickness (μm) | Bonding atmosphere | Tensile strength (MPa) |
|-----|---|---|----|---|----|----|----|---|----|----|---------------------------|--------------------|------------------------|
| 126 | 16.87 | 17.65 | 1.99 | 2.39 | 15.12 | 1.38 | | 6.26 | 5.03 | | 56 | air | 559.79 |
| 127 | 1.48 | 5.76 | 6.40 | 2.35 | 17.55 | 2.03 | | 7.95 | 8.14 | | 17 | air | 598.20 |
| 128 | 18.80 | 6.94 | 4.46 | 3.68 | 8.12 | 9.76 | | | 6.75 | 2.14 | 44 | air | 532.78 |
| 129 | 1.11 | 15.81 | 1.48 | 12.07 | 14.30 | 3.21 | | | 2.43 | 4.32 | 100 | air | 561.91 |
| 130 | 11.93 | 5.23 | 8.40 | 3.06 | 16.12 | 3.46 | | | 2.57 | 0.79 | 87 | air | 489.62 |
| 131 | 19.08 | 8.16 | 7.14 | 18.82 | 15.27 | 2.66 | | 8.65 | | 1.00 | 7 | air | 638.59 |
| 132 | 17.13 | 4.60 | 8.32 | 17.42 | 9.04 | 5.89 | | 3.62 | | 9.39 | 99 | air | 648.43 |
| 133 | 10.98 | 6.39 | 2.21 | 13.84 | 15.74 | 5.27 | | 1.69 | | 8.84 | 61 | air | 606.80 |
| 134 | 16.85 | 10.46 | 8.23 | 14.04 | 18.44 | 2.76 | | 6.12 | 7.85 | 6.24 | 86 | air | 686.32 |
| 135 | 6.77 | 3.49 | 0.84 | 18.31 | 18.13 | 9.74 | | 4.42 | 1.74 | 8.63 | 8 | air | 686.98 |
| 136 | 1.62 | 13.47 | 5.73 | 5.58 | 5.10 | 5.15 | | 4.90 | 8.03 | 0.99 | 76 | air | 591.02 |
| 137 | 14.15 | 10.48 | 5.36 | 8.23 | | 8.67 | 1.05 | 6.27 | | | 82 | air | 553.86 |
| 138 | 4.73 | 16.76 | 7.15 | 11.75 | | 3.18 | 5.63 | 4.94 | | | 11 | air | 558.13 |
| 139 | 13.72 | 2.53 | 5.30 | 17.24 | | 5.38 | 12.89 | 0.59 | | | 59 | air | 542.08 |
| 140 | 13.19 | 12.57 | 5.24 | 13.44 | | 9.16 | 8.39 | | 8.78 | | 76 | air | 578.61 |
| 141 | 5.18 | 9.68 | 5.66 | 5.41 | | 4.23 | 4.94 | | 4.82 | | 8 | air | 510.79 |
| 142 | 11.74 | 2.46 | 9.87 | 5.85 | | 3.54 | 1.75 | | 6.99 | | 19 | air | 528.20 |
| 143 | 18.12 | 13.53 | 2.09 | 14.51 | | 3.89 | 9.77 | | | 8.32 | 28 | air | 589.07 |
| 144 | 1.09 | 13.39 | 0.70 | 15.57 | | 1.05 | 7.82 | | | 6.09 | 92 | air | 576.56 |
| 145 | 2.52 | 5.11 | 3.66 | 9.83 | | 4.23 | 11.36 | | | 9.76 | 31 | air | 577.22 |
| 146 | 5.47 | 3.37 | 7.69 | 10.61 | | 7.55 | 10.08 | 8.88 | 1.40 | | 32 | air | 601.60 |
| 147 | 2.69 | 13.31 | 5.40 | 6.81 | | 6.19 | 10.93 | 7.58 | 1.92 | | 38 | air | 573.37 |
| 148 | 3.79 | 16.08 | 0.64 | 6.92 | | 0.96 | 4.58 | 2.68 | 4.69 | | 95 | air | 544.16 |
| 149 | 1.60 | 5.41 | 1.46 | 11.86 | | 4.25 | 4.05 | | 7.64 | 3.82 | 65 | air | 593.33 |
| 150 | 7.02 | 12.69 | 5.62 | 14.52 | | 2.70 | 12.87 | | 3.13 | 2.87 | 37 | air | 567.46 |

TABLE 7-7

| No. | \multicolumn{10}{c}{Chemical components in alloy foil (atomic %)} | Alloy foil thickness (μm) | Bonding atmosphere | Tensile strength (MPa) |
|---|---|---|---|---|---|---|---|---|---|---|---|---|---|
|  | B | P | Si | V | Cr | Mn | Co | W | Nb | Ti |  |  |  |
| 151 | 14.59 | 5.42 | 8.52 | 12.04 |  | 7.26 | 8.06 |  | 2.79 | 2.09 | 27 | air | 546.45 |
| 152 | 6.38 | 16.01 | 6.98 | 3.47 |  | 0.42 | 5.13 | 2.29 |  | 5.86 | 66 | air | 537.16 |
| 153 | 5.88 | 19.71 | 4.17 | 18.92 |  | 9.33 | 9.33 | 7.47 |  | 2.68 | 46 | air | 640.72 |
| 154 | 10.70 | 7.75 | 7.59 | 11.22 |  | 6.16 | 7.21 | 2.36 |  | 4.13 | 83 | air | 562.75 |
| 155 | 19.16 | 6.56 | 8.33 | 15.66 |  | 5.04 | 5.70 | 5.55 | 2.73 | 3.58 | 62 | air | 631.64 |
| 156 | 17.90 | 1.07 | 5.80 | 19.02 |  | 2.34 | 3.45 | 9.65 | 4.12 | 0.38 | 21 | air | 673.42 |
| 157 | 16.68 | 7.14 | 3.50 | 15.98 |  | 2.07 | 0.93 | 5.17 | 7.65 | 9.22 | 84 | air | 708.92 |
| 158 | 4.08 | 7.18 | 4.32 | 4.15 | 14.13 |  | 0.75 | 5.76 |  |  | 77 | air | 528.40 |
| 159 | 5.65 | 8.88 | 7.97 | 7.94 | 9.42 |  | 8.95 | 9.86 |  |  | 16 | air | 588.34 |
| 160 | 13.86 | 19.11 | 8.10 | 7.95 | 8.40 |  | 12.81 | 4.61 |  |  | 69 | air | 535.85 |
| 161 | 17.27 | 9.77 | 5.10 | 3.34 | 10.12 |  | 6.84 |  | 6.59 |  | 40 | air | 512.80 |
| 162 | 5.91 | 3.61 | 8.19 | 18.64 | 4.65 |  | 0.91 |  | 6.08 |  | 63 | air | 585.72 |
| 163 | 7.42 | 8.23 | 9.28 | 2.96 | 3.37 |  | 2.36 |  | 9.06 |  | 35 | air | 528.22 |
| 164 | 6.60 | 17.31 | 2.40 | 8.18 | 17.68 |  | 12.14 |  |  | 2.19 | 15 | air | 508.41 |
| 165 | 12.99 | 12.53 | 2.38 | 5.78 | 10.22 |  | 1.56 |  |  | 1.32 | 66 | air | 489.45 |
| 166 | 5.93 | 11.69 | 9.88 | 9.50 | 13.28 |  | 3.52 |  |  | 0.42 | 19 | air | 500.84 |
| 167 | 11.66 | 16.10 | 8.11 | 15.03 | 1.40 |  | 14.73 | 6.05 | 8.02 |  | 14 | air | 641.83 |
| 168 | 13.58 | 19.81 | 0.64 | 1.66 | 9.01 |  | 8.38 | 3.38 | 8.16 |  | 18 | air | 549.16 |
| 169 | 9.60 | 8.04 | 6.25 | 18.94 | 9.98 |  | 4.25 | 4.14 | 5.24 |  | 59 | air | 622.75 |
| 170 | 11.39 | 2.25 | 7.48 | 16.95 | 5.12 |  | 0.17 |  | 2.58 | 7.29 | 49 | air | 611.15 |
| 171 | 16.09 | 9.15 | 4.98 | 4.90 | 9.19 |  | 10.85 |  | 2.87 | 8.81 | 74 | air | 565.04 |
| 172 | 18.66 | 10.52 | 9.42 | 11.71 | 11.12 |  | 5.51 |  | 5.43 | 1.70 | 40 | air | 560.20 |
| 173 | 1.08 | 11.47 | 5.59 | 4.89 | 18.22 |  | 13.04 | 3.37 |  | 3.44 | 38 | air | 535.60 |
| 174 | 18.07 | 16.47 | 6.66 | 9.98 | 17.08 |  | 14.49 | 1.28 |  | 8.04 | 19 | air | 577.07 |
| 175 | 8.61 | 7.60 | 9.14 | 17.57 | 10.50 |  | 4.62 | 5.56 |  | 1.49 | 4 | air | 605.36 |

TABLE 7-8

| No. | \multicolumn{10}{c}{Chemical components in alloy foil (atomic %)} | Alloy foil thickness (μm) | Bonding atmosphere | Tensile strength (MPa) |
|---|---|---|---|---|---|---|---|---|---|---|---|---|---|
|  | B | P | Si | V | Cr | Mn | Co | W | Nb | Ti |  |  |  |
| 176 | 6.98 | 19.70 | 2.72 | 15.25 | 6.66 |  | 14.28 | 3.43 | 1.57 | 3.81 | 93 | air | 602.00 |
| 177 | 12.64 | 12.26 | 7.55 | 19.05 | 6.73 |  | 4.06 | 7.75 | 5.06 | 4.50 | 51 | air | 694.16 |
| 178 | 1.26 | 16.23 | 0.78 | 7.08 | 16.40 |  | 2.76 | 4.52 | 2.79 | 1.24 | 23 | air | 560.00 |
| 179 | 19.15 | 12.04 | 1.86 | 15.83 | 12.02 | 4.71 | 13.50 | 1.03 |  |  | 74 | air | 539.46 |
| 180 | 16.66 | 7.18 | 8.58 | 17.79 | 11.57 | 9.57 | 0.73 | 9.83 |  |  | 9 | air | 637.23 |
| 181 | 6.11 | 18.32 | 4.53 | 4.88 | 0.74 | 3.46 | 6.69 | 4.49 |  |  | 93 | air | 519.34 |
| 182 | 15.40 | 17.62 | 5.62 | 2.92 | 9.69 | 8.02 | 11.09 |  | 0.32 |  | 80 | air | 466.79 |
| 183 | 7.16 | 1.64 | 4.73 | 12.54 | 7.58 | 3.60 | 1.73 |  | 4.33 |  | 44 | air | 543.03 |
| 184 | 12.46 | 15.78 | 1.51 | 13.72 | 17.38 | 6.08 | 14.62 |  | 2.61 |  | 24 | air | 536.86 |
| 185 | 8.68 | 15.99 | 2.29 | 14.84 | 15.08 | 8.61 | 13.25 |  |  | 7.95 | 54 | air | 587.83 |
| 186 | 14.55 | 8.10 | 1.71 | 2.56 | 5.32 | 0.25 | 4.15 |  |  | 7.24 | 99 | air | 520.71 |
| 187 | 5.64 | 7.62 | 3.93 | 3.85 | 4.19 | 9.39 | 1.63 |  |  | 3.44 | 54 | air | 496.81 |
| 188 | 16.13 | 18.42 | 6.15 | 1.69 | 3.22 | 6.11 | 2.94 | 4.29 | 9.07 |  | 68 | air | 564.83 |
| 189 | 1.03 | 13.58 | 2.70 | 7.42 | 0.78 | 5.08 | 9.01 | 4.99 | 6.16 |  | 74 | air | 580.12 |
| 190 | 1.32 | 2.89 | 0.93 | 1.52 | 15.41 | 1.01 | 1.61 | 0.32 | 0.97 |  | 76 | air | 467.57 |
| 191 | 17.77 | 17.93 | 5.79 | 18.85 | 6.78 | 1.97 | 6.11 |  | 9.35 | 2.20 | 5 | air | 627.29 |
| 192 | 19.57 | 15.63 | 8.21 | 2.06 | 3.24 | 3.37 | 4.63 |  | 1.00 | 5.01 | 47 | air | 507.37 |
| 193 | 4.36 | 17.77 | 6.39 | 14.53 | 16.72 | 3.94 | 13.27 |  | 2.54 | 5.97 | 94 | air | 588.23 |
| 194 | 18.55 | 13.88 | 8.75 | 6.60 | 14.40 | 9.75 | 5.94 | 6.83 |  | 7.28 | 86 | air | 609.55 |
| 195 | 8.55 | 4.59 | 9.96 | 9.27 | 7.03 | 9.23 | 3.11 | 1.85 |  | 5.36 | 31 | air | 557.71 |
| 196 | 10.25 | 18.42 | 6.30 | 7.56 | 6.72 | 9.75 | 7.09 | 7.75 |  | 5.31 | 79 | air | 607.76 |
| 197 | 4.02 | 10.59 | 5.35 | 8.07 | 17.72 | 6.14 | 5.25 | 9.15 | 4.38 | 7.57 | 53 | air | 673.13 |
| 198 | 7.44 | 13.07 | 2.78 | 0.10 | 2.91 | 5.83 | 8.42 | 8.83 | 9.26 | 0.95 | 38 | air | 611.21 |
| 199 | 7.12 | 13.06 | 7.99 | 2.15 | 15.11 | 1.27 | 6.92 | 2.50 | 3.12 | 2.66 | 13 | air | 528.79 |

| | Chemical components in alloy foil (atomic %) | | | | | | | | | | Alloy foil thickness | Bonding | Tensile strength |
|---|---|---|---|---|---|---|---|---|---|---|---|---|---|
| No. | B | P | Si | V | Cr | Mn | Co | W | Nb | Ti | (μm) | atmosphere | (MPa) |
| 200 | 0.23 | 19.13 | 3.66 | 19.92 | | | | | | | 35 | air | 0.12 |
| 201 | 24.10 | 7.48 | 4.53 | 19.46 | | | | | | | 72 | air | 154.96 |
| 202 | 11.47 | 0.82 | 2.33 | 6.50 | | | | | | | 36 | air | 0.21 |
| 203 | 16.21 | 22.90 | 9.36 | 9.74 | | | | | | | 16 | air | 189.12 |
| 204 | 6.42 | 14.89 | 0.21 | 16.09 | | | | | | | 78 | air | 0.05 |
| 205 | 1.99 | 2.92 | 17.92 | 4.40 | | | | | | | 21 | air | 205.31 |
| 206 | 3.53 | 15.52 | 4.35 | 0.06 | | | | | | | 72 | air | 0.15 |
| 207 | 10.71 | 7.43 | 3.42 | 28.24 | | | | | | | 74 | air | 311.1 |
| 208 | 14.72 | 10.57 | 2.16 | 7.55 | 23.95 | | | | 4.12 | | 32 | air | 156.41 |
| 209 | 10.58 | 8.91 | 1.97 | 15.39 | | 11.51 | 1.80 | | | | 11 | air | 189.12 |
| 210 | 5.25 | 10.27 | 4.57 | 6.84 | | | | 16.17 | | | 87 | air | 186.44 |
| 211 | 18.76 | 17.67 | 8.25 | 6.95 | | 1.88 | | | | | 151 | air | 53.22 |

As shown in Table 7, a very satisfactory tensile strength of over the target level of 400 MPa was exhibited by joints No.1 to 199 (invention examples) which were obtained by liquid phase diffusion bonding wherein the bonding materials were diffusion bonding alloy foils according to the ninth to twelfth inventions and the thirteenth invention.

In contrast, as shown in Table 6, a tensile strength of under the target level of 400 MPa, which was completely unsatisfactory, was exhibited by all of the joints No.200 to 212 (comparative examples) which were obtained by liquid phase diffusion bonding wherein the bonding materials were comparison alloy foils not conforming to the invention.

Specifically, No.200 of the comparative examples was a case where the B content was insufficient and the melting point was over 1300° C., resulting in markedly lower tensile strength, while No.201 was a case where the B content was high and coarse borides were abundantly produced at the alloy side of the bond near the joint, thus reducing the tensile strength of the joint.

No.202 was a case where the P content was insufficient and the melting point was therefore over 1300° C., resulting in markedly lower tensile strength, while No.203 was a case where the P content was high and coarse phosphides were abundantly produced at the bonded material side of the bond near the joint, thus reducing the joint tensile strength.

No.204 was a case where the Si content was insufficient and the melting point was over 1300° C., resulting in markedly lower tensile strength, while No.205 was a case where the Si content was in excess and coarse $SiO_2$-based oxides were produced in the insert metal during bonding, thus reducing the joint tensile strength.

No.206 was a case where the V content was insufficient so that the oxide film produced on the bonded material alloy surface was not adequately countered and the tensile strength of the joint was reduced, while No.207 was a case where the V content was in excess and the melting point was extremely high, so that liquid phase diffusion bonding could not be adequately accomplished and the tensile strength of the joint was reduced.

No.208 was a case where Cr was abundantly present resulting in a considerably high melting point so that liquid phase diffusion bonding could not be adequately accomplished and the tensile strength of the joint was reduced, while No.209 was a case where the Mn content was in excess impairing the toughness and reducing the joint strength.

No.210 was a case where the Nb content was in excess, impairing the toughness and lowering the joint tensile strength.

No.211 was a case where the insert metal thickness was too large, resulting in reduced joint tensile strength.

As shown above, liquid phase diffusion bonding using the comparison insert metals which partially satisfied the conditions of the invention but did not satisfy all of those conditions was not able to provide the target joint tensile strength of 400 MPa.

Figure 12:
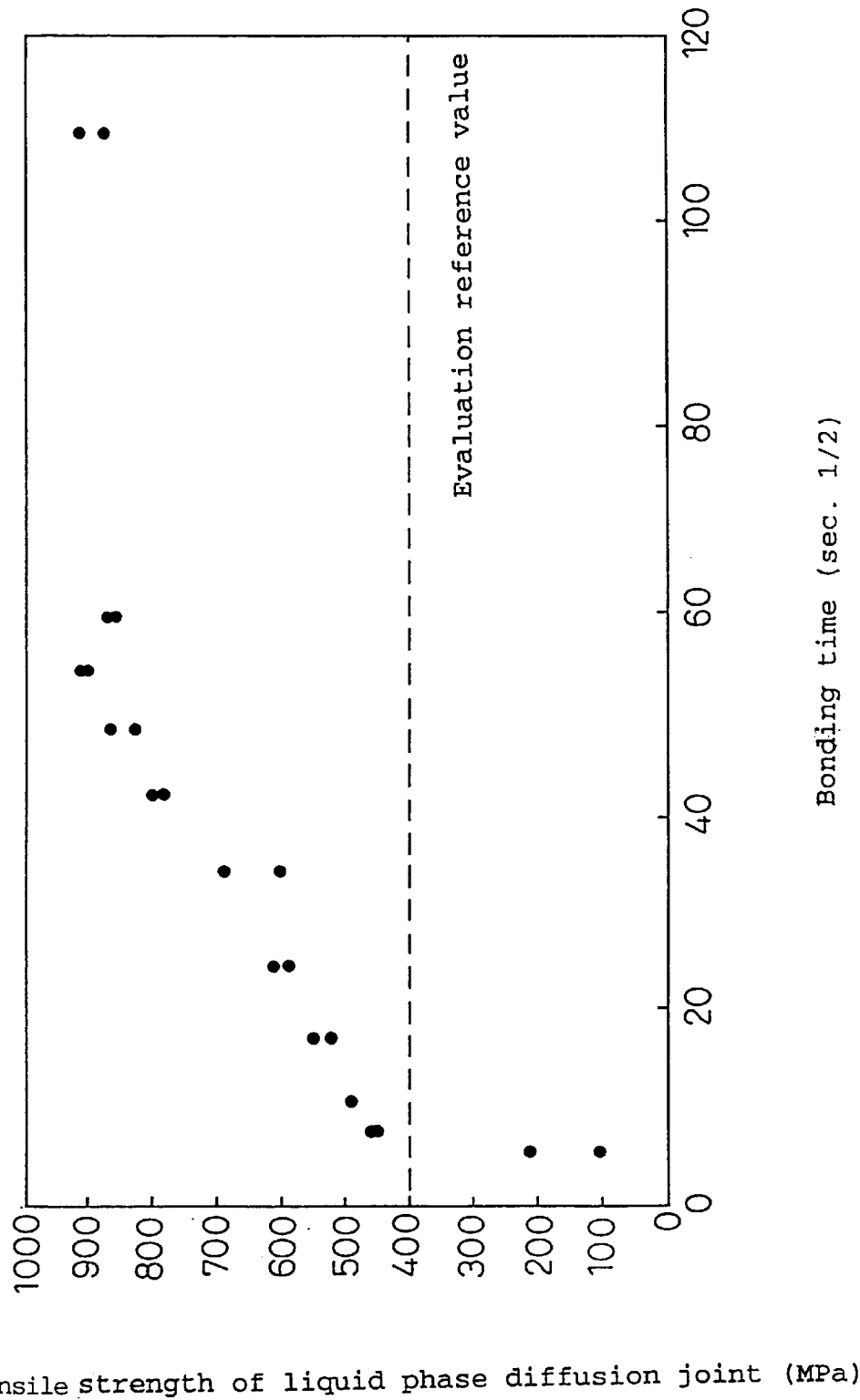
FIG. 12 is a graph showing the relationship between the joint tensile strength and the bonding time of a Ni-based insert metal for liquid phase diffusion bonding using an Fe-based material as the bonded material.

FIG. 12 shows the relationship between the bonding time and the joint tensile strength (MPa) for diffusion bonding alloy foils according to the ninth to twelfth inventions and the thirteenth invention, indicating that the bonding time is shorter and a high joint tensile strength is obtained.

Figure 13:
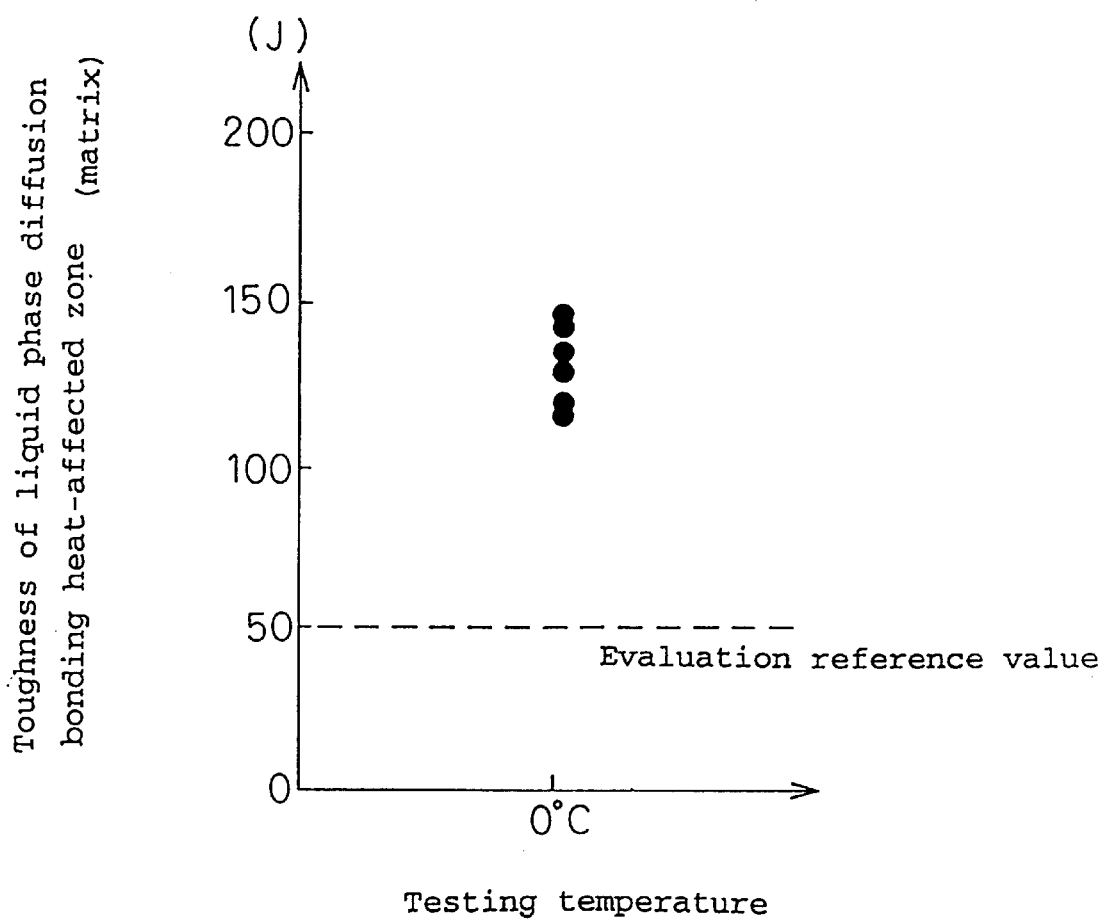
FIG. 13 is a graph showing the toughness of the matrix heat affected zone at a testing temperature of 0° C. after liquid phase diffusion bonding using an Fe-based material as the bonded material.

FIG. 13 is a graph showing the toughness (J) of the matrix heat affected zone at a testing temperature of 0° C.; even when the bonding was at a temperature of 1050° C. or higher, the toughness was shown to be higher than with insert metals where B was used as the diffusion element (see FIG. 9) and about the same as with insert metals where P was used as the diffusion element (see FIG. 11).

The insert metals in which B and P were added in combination had good amorphous formation, but when the Si content is also high, accelerated vitrification results in poorer founding properties and a non-uniform thickness of the foil.

FIG. 14 shows that because of this decrease, the joint tensile strength is lowered when the Si content exceeds 10%.

The relationship between the joint tensile strength and the V concentration in the insert metal was substantially no different from FIG. 4, the relationship between the joint tensile strength and the B concentration in the insert metal was substantially no different from FIG. 6, the relationship between the joint tensile strength and the P concentration in the insert metal was substantially no different from FIG. 10, and the relationship between the insert metal thickness and the joint tensile strength was substantially no different from FIG. 7, and these are therefore not shown.

The relationship between the joint tensile strength (MPa) and the bonding time was confirmed by results which compared favorably with the insert metals using B as the diffusion element.

As explained above, each of the inventions of the present invention allow bonding of Fe-based materials to be accomplished in a relatively short time, and can ensure adequate bonding strength and toughness of matrix heat-affected zones while also stably ensuring sufficient tensile strength of joints.

In the aforementioned examples the liquid phase diffusion bonding alloy foils are used for bonding of carbon steel, but such bonding is not limited to carbon steel, and the liquid phase diffusion bonding alloy foils may be applied as well to bonding of stainless steel, high nickel-based alloys, heat resistant alloy steels and the like.

INDUSTRIAL APPLICABILITY

According to the present invention it is possible to accomplish liquid phase diffusion bonding of high nickel-based alloys, stainless steel, heat resistant alloy steels and other alloys and Fe-based materials (steel plates, steel pipes, reinforcing steel, bar steel, etc.) in an oxidizing atmosphere, while joints with high tensile strength can also be ensured in a short time, to allow drastic reduction in the time required to accomplish bonding.

What is claimed is:

1. A liquid phase diffusion bonding alloy foil capable of bonding in an oxidizing atmosphere, characterized by having a composition containing
B: 1.0–16%,
Si: 0.5–<10.0%,
V: 0.1–20.0%
in terms of atomic percent and the remainder substantially Ni and unavoidable impurities, and by having a thickness of 3–100 μm.

2. A liquid phase diffusion bonding alloy foil capable of bonding in an oxidizing atmosphere, characterized by having a composition containing
B: 1.0–16%,
Si: 0.5–<10.0%,
V: 0.1–20.0%,
and at least one element selected from the group consisting of
Cr: 0.1–20.0%,
Mn: 0.1–10.0%,
Co: 0.1–15.0%
in terms of atomic percent and the remainder substantially Ni and unavoidable impurities, and by having a thickness of 3–100 μm.

3. A liquid phase diffusion bonding alloy foil capable of bonding in an oxidizing atmosphere, characterized by having a composition containing
B: 1.0–16%,
Si: 0.5–<10.0%,
V: 0.1–20.0%,
and at least one element selected from the group consisting of
W: 0.1–10.0%,
Nb: 0.1–10.0%,
Ti: 0.1–10.0%,
in terms of atomic percent and the remainder substantially Ni and unavoidable impurities, and by having a thickness of 3–100 μm.

4. A liquid phase diffusion bonding alloy foil capable of bonding in an oxidizing atmosphere, characterized by having a composition containing
B: 1.0–16%,
Si: 0.5%–<10.0%,
V: 0.1–20.0%,
and at least one element selected from the group consisting of
Cr: 0.1–20.0%,
Mn: 0.1–10.0%,
Co: 0.1–15.0%,
and additionally at least one element selected from the croup consisting of
W: 0.1–10.0%,
Nb: 0.1–10.0%,
Ti: 0.1–10.0%,
in terms of atomic percent and the remainder substantially Ni and unavoidable impurities, and by having a thickness of 3–100 μm.

5. A liquid phase diffusion bonding alloy foil capable of bonding in an oxidizing atmosphere, characterized by having a composition containing
P: 1.0–20.0%, B: 1.0–16%,
Si: 0.5–<10.0%,
V: 0.1–20.0%
in terms of atomic percent and the remainder substantially Ni and unavoidable impurities, and by having a thickness of 3–100 μm.

6. A liquid phase diffusion bonding alloy foil capable of bonding in an oxidizing atmosphere, characterized by having a composition containing
P: 1.0–20.0%, B: 1.0–16%,
Si: 0.5–<10.0%,
V: 0.1–20.0%,
and at least one element selected from the group consisting of
Cr: 0.1–20.0%,
Mo: 0.1–15.0%,
Co: 0.1–15.0%
in terms of atomic percent and the remainder substantially Ni and unavoidable impurities, and by having a thickness of 3–100 μm.

7. A liquid phase diffusion bonding alloy foil capable of bonding in an oxidizing atmosphere, characterized by having a composition containing
P: 1.0–20.0%, B: 1.0–16%,
Si: 0.5–<10.0%,
V: 0.1–20.0%,
and at least one element selected from the group consisting of
W: 0.1–10.0%,
Nb: 0.1–10.0%,
Ti: 0.1–10.0%
in terms of atomic percent and the remainder substantially Ni and unavoidable impurities, and by having a thickness of 3–100 μm.

8. A liquid phase diffusion bonding alloy foil capable of bonding in an oxidizing atmosphere, characterized by having a composition containing
P: 1.0–20.0%, B: 1.0–16%,
Si: 0.5–<10.0%,
V: 0.1–20.0%,
and at least one element selected from the group consisting of
Cr: 0.1–20.0%,
Mo: 0.1–15.0%,
Co: 0.1–15.0%,
and additionally at least one element selected from the group consisting of
W: 0.1–10.0%,
Nb: 0.1–10.0%,
Ti: 0.1–10.0%
in terms of atomic percent and the remainder substantially Ni and avoidable impurities, and by having a thickness of 3–100 μm.

9. A liquid phase diffusion bonding alloy foil capable of bonding in an oxidizing atmosphere, characterized by having a composition containing P: 1.0–20.0%,
B: 1.0–16%,
Si: 0.5–<10.0%,
V: 0.1–20.0% in terms of atomic percent and the remainder substantially Ni and unavoidable impurities, and by having a thickness of 3–100 μm.

10. A liquid phase diffusion bonding alloy foil capable of bonding in an oxidizing atmosphere, characterized by having a composition containing P: 1.0–20.0%,
B: 1.0–16%,
Si: 0.5–<10.0%,
V: 0.1–20.0%, and at least one element selected from the group consisting of Cr: 0.1–20.0%,
Mn: 0.1–10.0%,
Co: 0.1–15.0% in terms of atomic percent and the remainder substantially Ni and unavoidable impurities, and by having a thickness of 3–100 μm.

11. A liquid phase diffusion bonding alloy foil capable of bonding in an oxidizing atmosphere, characterized by having a composition containing P: 1.0–20.0%,
B: 1.0–16%,
Si: 0.5–<10.0%,
V: 0.1–20.0%, and at least one element selected from the croup consisting of W: 0.1–10.0%,
Nb: 0.1–10.0%,
Ti: 0.1–10.0% in terms of atomic percent and the remainder substantially Ni and unavoidable impurities, and by having a thickness of 3–100 μm.

12. A liquid phase diffusion bonding alloy foil capable of bonding in an oxidizing atmosphere, characterized by having a composition containing P: 1.0–20.0%,
B: 1.0–16%,
Si: 0.5–<10.0%,
V: 0.1–20.0%, and at least one element selected from the group consisting of Cr: 0.1–20.0%,
Mn: 0.1–10.0%,
Co: 0.1–15.0%, and additionally at least one element selected from the group consisting of W: 0.1–10.0%,
Nb: 0.1–10.0%,
Ti: 0.1–10.0% in terms of atomic percent and the remainder substantially Ni and unavoidable impurities, and by having a thickness of 3–100 μm.

13. A liquid phase diffusion bonding alloy foil capable of bonding in an oxidizing atmosphere according claim 1, characterized in that the crystal structure of the composition is substantially amorphous.

14. A liquid phase diffusion bonding alloy foil capable of bonding in an oxidizing atmosphere according to claim 2, characterized in that the crystal structure of the composition is substantially amorphous.

15. A liquid phase diffusion bonding alloy foil capable of bonding in an oxidizing atmosphere according to claim 3, characterized in that the crystal structure of the composition is substantially amorphous.

16. A liquid phase diffusion bonding alloy foil capable of bonding in an oxidizing atmosphere according to claim 4, characterized in that the crystal structure of the composition is substantially amorphous.

17. A liquid phase diffusion bonding alloy foil capable of bonding in an oxidizing atmosphere according to claim 5, characterized in that the crystal structure of the composition is substantially amorphous.

18. A liquid phase diffusion bonding alloy foil capable of bonding in an oxidizing atmosphere according to claim 6, characterized in that the crystal structure of the composition is substantially amorphous.

19. A liquid phase diffusion bonding alloy foil capable of bonding in an oxidizing atmosphere according to claim 7, characterized in that the crystal structure of the composition is substantially amorphous.

20. A liquid phase diffusion bonding alloy foil capable of bonding in an oxidizing atmosphere according to claim 8, characterized in that the crystal structure of the composition is substantially amorphous.

21. A liquid phase diffusion bonding alloy foil capable of bonding in an oxidizing atmosphere according to claim 9, characterized in that the crystal structure of the composition is substantially amorphous.

22. A liquid phase diffusion bonding alloy foil capable of bonding in an oxidizing atmosphere according to claim 10, characterized in that the crystal structure of the composition is substantially amorphous.

23. A liquid phase diffusion bonding alloy foil capable of bonding in an oxidizing atmosphere according to claim 11, characterized in that the crystal structure of the composition is substantially amorphous.

24. A liquid phase diffusion bonding alloy foil capable of bonding in an oxidizing atmosphere according to claim 12, characterized in that the crystal structure of the composition is substantially amorphous.

* * * * *

UNITED STATES PATENT AND TRADEMARK OFFICE
CERTIFICATE OF CORRECTION

PATENT NO. : 6,264,761 B1
DATED : July 24, 2001
INVENTOR(S) : Yasushi Hasegawa et al.

It is certified that error appears in the above-identified patent and that said Letters Patent is hereby corrected as shown below:

Column 25,
Line 1, insert Table 5-2 (on attached page).

Column 43,
Line 66, change "croup" to -- group --.

Column 45,
Line 36, change "croup" to -- group --.

UNITED STATES PATENT AND TRADEMARK OFFICE
CERTIFICATE OF CORRECTION

PATENT NO.    : 6,264,761 B1
DATED         : July 24, 2001
INVENTOR(S)   : Yasushi Hasegawa et al.

It is certified that error appears in the above-identified patent and that said Letters Patent is hereby corrected as shown below:

Table 5-2

| No. | Chemical components in alloy foil (atomic %) | | | | | | | | | Alloy foil thickness (μm) | Bonding atmosphere | Tensile strength (MPa) |
|---|---|---|---|---|---|---|---|---|---|---|---|---|
| | P | Si | V | Cr | Mo | Co | W | Nb | Ti | | | |
| 26 | 18.00 | 0.96 | 0.17 | 11.22 | | 6.30 | | | | 74 | air | 450.83 |
| 27 | 18.45 | 1.07 | 1.36 | 6.62 | | 7.39 | | | | 8 | air | 456.81 |
| 28 | 10.03 | 9.47 | 0.14 | 8.29 | | 7.45 | | | | 63 | air | 450.68 |
| 29 | 19.21 | 4.79 | 15.13 | 17.07 | 0.46 | 13.34 | | | | 61 | air | 525.64 |
| 30 | 15.34 | 8.01 | 16.16 | 12.24 | 14.21 | 2.95 | | | | 91 | air | 530.79 |
| 31 | 2.98 | 1.03 | 4.00 | 3.85 | 3.19 | 2.34 | | | | 31 | air | 469.99 |
| 32 | 6.72 | 7.33 | 15.88 | | | | 5.62 | | | 24 | air | 585.57 |
| 33 | 17.21 | 10.79 | 17.57 | | | | 6.44 | | | 24 | air | 602.28 |
| 34 | 15.22 | 1.96 | 18.51 | | | | 7.97 | | | 85 | air | 622.23 |
| 35 | 13.18 | 3.09 | 16.46 | | | | | 2.51 | | 47 | air | 549.89 |
| 36 | 1.25 | 10.62 | 1.72 | | | | | 6.89 | | 28 | air | 506.85 |
| 37 | 12.59 | 6.39 | 18.13 | | | | | 0.40 | | 31 | air | 543.45 |
| 38 | 11.40 | 10.95 | 1.83 | | | | | | 5.30 | 99 | air | 501.51 |
| 39 | 17.02 | 6.36 | 2.30 | | | | | | 2.13 | 51 | air | 478.51 |
| 40 | 19.13 | 8.79 | 15.22 | | | | | | 1.53 | 52 | air | 538.31 |
| 41 | 12.05 | 1.10 | 18.56 | | | | 1.06 | 6.34 | | 11 | air | 597.78 |
| 42 | 6.66 | 9.32 | 3.82 | | | | 5.87 | 0.15 | | 38 | air | 528.78 |
| 43 | 9.83 | 12.20 | 11.53 | | | | 8.96 | 3.43 | | 21 | air | 621.20 |
| 44 | 10.63 | 5.81 | 0.51 | | | | | 6.76 | 7.41 | 77 | air | 559.19 |
| 45 | 17.87 | 10.62 | 9.06 | | | | | 1.19 | 0.60 | 62 | air | 508.47 |
| 46 | 19.96 | 7.85 | 3.49 | | | | | 3.06 | 8.19 | 22 | air | 554.42 |
| 47 | 6.26 | 11.96 | 3.05 | | | | 1.22 | | 6.02 | 33 | air | 525.63 |
| 48 | 13.50 | 6.78 | 17.98 | | | | 4.53 | | 9.23 | 12 | air | 659.08 |
| 49 | 15.86 | 8.75 | 5.04 | | | | 3.07 | | 6.02 | 71 | air | 554.06 |
| 50 | 18.74 | 11.47 | 15.15 | | | | 5.69 | 1.45 | 8.22 | 27 | air | 658.51 |

Signed and Sealed this

Sixth Day of August, 2002

Attest:

JAMES E. ROGAN
Attesting Officer         Director of the United States Patent and Trademark Office